United States Patent
Yamamoto et al.

(10) Patent No.: US 6,868,175 B1
(45) Date of Patent: Mar. 15, 2005

(54) PATTERN INSPECTION APPARATUS, PATTERN INSPECTION METHOD, AND RECORDING MEDIUM

(75) Inventors: Masahiro Yamamoto, Kawasaki (JP); Tadashi Kitamura, Kawasaki (JP)

(73) Assignee: Nanogeometry Research, Kawasaki (JP)

( * ) Notice: Subject to any disclaimer, the term of this patent is extended or adjusted under 35 U.S.C. 154(b) by 581 days.

(21) Appl. No.: 09/648,372

(22) Filed: Aug. 25, 2000

(30) Foreign Application Priority Data

Aug. 26, 1999 (JP) .......................................... 11-239586
Mar. 21, 2000 (JP) ....................................... 2000-078847

(51) Int. Cl.$^7$ ............................................... G06K 9/00
(52) U.S. Cl. ...................... 382/145; 382/143; 382/144
(58) Field of Search ...................... 382/141, 143–151, 382/199; 348/86, 87, 125, 126; 356/237.1, 237.2, 237.4, 237.5; 250/559.46

(56) References Cited

U.S. PATENT DOCUMENTS

| | | | |
|---|---|---|---|
| 4,805,123 A | | 2/1989 | Specht et al. |
| 5,129,009 A | * | 7/1992 | Lebeau .......................... 382/149 |
| 5,137,362 A | | 8/1992 | LeBeau |
| 5,398,292 A | * | 3/1995 | Aoyama ....................... 382/199 |
| 5,563,702 A | | 10/1996 | Emery et al. |
| 6,047,083 A | | 4/2000 | Mizuno |

FOREIGN PATENT DOCUMENTS

| | | |
|---|---|---|
| DE | 19803021 A1 | 7/1998 |
| EP | 0930499 A1 | 7/1999 |
| JP | 63-88682 | 4/1988 |

(List continued on next page.)

OTHER PUBLICATIONS

M. Hashimoto et al., "High–Speed Template Matching Algorithm Using Information of Contour Points," Systems and Computers in Japan, vol. 23, No. 9, pp. 78–87, 1992.

(List continued on next page.)

*Primary Examiner*—Vikkram Bali
(74) *Attorney, Agent, or Firm*—Finnegan, Henderson, Farabow, Garrett & Dunner, LLP

(57) ABSTRACT

First, a pattern inspection apparatus detects the first edge from an image of a pattern to-be-inspected. Next, the pattern inspection apparatus conducts matching of the image of the pattern to-be-inspected and the first reference pattern by comparing the first edge and an edge of the first reference pattern. Since, as a result of the matching, a shift quantity $S_1$ can be obtained, and then the first reference pattern is shifted by this shift quantity $S_1$. Subsequently the pattern to-be-inspected is inspected by comparing the first edge and the edge of the first reference pattern so shifted. In this first inspection, pattern deformation quantities are obtained and defects are detected. A shift quantity $S_2$ can be obtained as one of the pattern deformation quantities. Next, in order to detect the second edge from the pattern image to-be-inspected, the corresponding second reference pattern is shifted by a shift quantity $S_1+S_2$. Using the second reference pattern so shifted, a profile is obtained on the pattern image to-be-inspected and the second edge is detected. Then, by comparing the second edge and the edge of the second reference pattern so shifted, the pattern to-be-inspected is inspected. Also in this second inspection, the pattern deformation quantities are obtained and defects are detected. A shift quantity $S_3$ can be obtained as one of the pattern deformation quantities.

22 Claims, 49 Drawing Sheets

FOREIGN PATENT DOCUMENTS

| | | |
|---|---|---|
| JP | 4-194702 | 7/1992 |
| JP | 02299481 | 9/1992 |
| JP | 8-76359 | 3/1996 |
| JP | 08110305 A | 4/1996 |
| JP | 10307917 A | 11/1998 |
| JP | 10312461 A | 11/1998 |
| JP | 10037364 | 8/1999 |

OTHER PUBLICATIONS

"Automatic Failure Part Tracing Method for a Logic LSI Using an Electron Beam Tester", *NEC Technical Report*, vol. 50, No. 6, pp. 21–31, 1997.

R. M. Haralick, "Digital Step Edges From ZERO Crossing of Second Directional Derivatives", *IEEE Transactions on Pattern Analysis Machine Intelligence*, vol. PAMI–6, No. 1, pp. 58–68, 1984.

Carsten Steger, "An Unbiased Detector of Curvilinear Structures", *IEEE Transactions on Pattern Analysis Machine Intelligence*, vol. 20, No. 2, 113–25, Feb. 1998.

Official Notice of Rejection, Japanese Patent Office, dated Feb. 21, 2003, for Patent Appln. No. 2000–258234, with English Translation.

* cited by examiner

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 80 | 60 | 40 | 20 | 0 | 0 | 0 | 0 |
| 100 | 100 | 100 | 80 | 60 | 40 | 20 | 0 |
| 100 | 100 | 100 | 100 | 100 | 100 | 80 | 60 |
| 100 | 100 | 100 | 100 | 100 | 100 | 100 | 100 |
| 100 | 100 | 100 | 100 | 100 | 100 | 100 | 100 |

FIG.14

| 0  | 0   | 0   | 0  | 0   | 0   | 0  | 0   |
|----|-----|-----|----|-----|-----|----|-----|
| 15 | 0   | 0   | 0  | 0   | 0   | 0  | 0   |
| 85 | 55  | 45  | 15 | 0   | 0   | 0  | 0   |
| 85 | 100 | 100 | 85 | 55  | 40  | 20 | 0   |
| 15 | 45  | 55  | 85 | 100 | 100 | 60 | 50  |
| 0  | 0   | 0   | 15 | 45  | 60  | 90 | 100 |
| 0  | 0   | 0   | 0  | 0   | 0   | 30 | 50  |
| 0  | 0   | 0   | 0  | 0   | 0   | 0  | 0   |

FIG.16

| 0 | 0 | 0 | 20 | 0 | 0 | 0 | 0 | 0 | 0 | 20 | 0 | 0 | 0 | 0 |
|---|---|---|----|---|---|---|---|---|---|----|---|---|---|---|

FIG.18

| 0 | 20 | 20 | 20 | 20 | 20 | 0 | 0 | 20 | 20 | 20 | 20 | 20 | 0 | 0 |
|---|----|----|----|----|----|---|---|----|----|----|----|----|---|---|

FIG.19

| 0 | 0 | 0 | 1 | 0 | 0 | 0 | 0 | 0 | 0 | 1 | 0 | 0 | 0 | 0 |
|---|---|---|---|---|---|---|---|---|---|---|---|---|---|---|

FIG.20

| 0 | 10 | 15 | 20 | 15 | 10 | 0 | 0 | 10 | 15 | 20 | 15 | 10 | 0 | 0 |

FIG.21

| 0 | 0 | 1 | 0 | 0 | 0 | 0 | 0 | 0 | 0 | 0 | 1 | 0 | 0 | 0 |

FIG.22

| 0 | 10 | 18 | 20 | 18 | 10 | 0 | 0 | 10 | 18 | 20 | 18 | 10 | 0 | 0 |

FIG.23

| 0.5 | 0.9 | 1.0 | 0.9 | 0.5 |

FIG.24

PATTERN INSPECTION APPARATUS, PATTERN INSPECTION METHOD, AND RECORDING MEDIUM

This application is based on Japanese Patent Application Nos. 11-239586 (1999) filed Aug. 26, 1999, and 2000-78847 filed Mar. 21, 2000, the contents of which are incorporated hereinto by reference.

BACKGROUND OF THE INVENTION

1. Field of the Invention

The present invention relates to a pattern inspection apparatus, a method for performing pattern inspection and a recording medium. In particular, the present invention relates to a pattern inspection apparatus for inspecting fine patterns, for example, such as semiconductors (LSI), liquid crystal panels, and masks (reticles) for those, all of which are formed according to design data, to a method for performing the pattern inspection therefor, and to a recording medium therefor.

2. Description of the Related Art

For the pattern inspection of wafers in the manufacturing process of semiconductor integrated circuits or the pattern inspection of masks for pattern formation thereof, an optical pattern inspection apparatus with the use of a method called die-to-die comparison is used. This inspection method is a method whereby a defect is found by comparing an image obtained from a die to-be-inspected (die that is an object of inspection) and an image obtained from the equivalent position of a die adjacent thereto.

On the other hand, for the inspection of a mask called a reticle where no adjacent dies exist, a method called die-to-database comparison is adopted. That is, there is used a method where CAD data is converted into an image format and used instead of the adjacent dies and the same inspection as described above is performed. The technology concerned is disclosed, for example, in the U.S. Pat. No. 5,563,702, "Automated photomask inspection apparatus and method." However, in this technique, since a rounded part of a corner of an actual pattern formed on the wafer is likely to be recognized as a defect. This problem is circumvented by a method of conducting pretreatment to give a rounding to the image obtained from CAD data as a countermeasure. In such a circumstance where the corners are rounded, when the die to database comparative inspection is performed, it is likely that pattern deformation having no necessity of being judged as a defective corner is recognized as a defect, and this may happen frequently even with the above-described pretreatment. Conversely, if a setting that ignores the pattern deformation of the corner is adopted, there arises a dilemma that a minute defect existing somewhere other than in the corners cannot be recognized.

Presently, for masks, inspection on the basis of the die-to-database comparison system has been put into practical use because the mask should be exactly in conformity to the CAD data. However, the pattern transferred on the wafer are allowed to have pattern deformation of such an amount that electrical characteristic and the like are secured, and in practice, the pattern deformation occurs by some extent because of difference of an exposure condition etc.

Moreover, the pattern inspection on the basis of the aforesaid die-to-die comparison system cannot detect the defects that occur all over the dies on the wafer in common caused by the mask failure called the systematic failure. That is, the same defects occur in the die to-be-inspected and in the adjacent dies that are to be compared with the die to-be-inspected, and hence the comparison between the both dies cannot lead to the detection of the defect of an individual die.

To solve the problem, although it has not been put into practical use because of calculation cost, etc., there is proposed matching inspection between the CAD data and the wafer image. Regarding this technique, there is, for example, a literature: "Automatic failure part tracing method for a logic LSI using an electron beam tester," NEC Technical Report, vol. 50, No. 6, 1997. In this literature, there are disclosed: a method with the use of a projection of wiring edges on the x- and y-axes; a method where wiring corners are focused on; and a method where a genetic algorithm is applied. Moreover, as a method adopted in this literature, there is described a matching method where, after edges have undergone the linear approximation, closed areas are extracted, and those closed areas are used for the inspection. However, neither of those methods can attain an inspection speed that is usable in high-speed inspection and furthermore none of them can perform the matching while detecting the deformation quantity of the pattern.

In addition, presently, there is used the auto defect classification (ADC) that performs the comparison between an image having a defect (defect image) and an image of the adjacent die corresponding to this (reference image). However, unevenness of the luminance of the reference image and the like may affect recognition accuracy. Moreover, there is a case where it is difficult to determine the inside and the outside of the pattern only from the image. In such cases, it is often the case that it is difficult to distinguish between short circuit and deficiency and the like. In addition, since this method cannot give information concerning which pattern is destroyed by the defect, fatal defects to the pattern and a mere defect other than such defects cannot be classified.

The inspection method using the die-to-die comparison intrinsically bears the error arising from staging precision of the inspection apparatus and precision of the optical system, and the error is approximately ten times larger than the wiring pattern width or more. Due to this fact, even when a defect position is projected onto a pattern that the operator wishes to create (design pattern), it is impossible to specify the defect position of the pattern accurately.

Recently, the pattern width of integrated circuits becomes comparable to wavelengths of the light sources to be used in the exposure process, or goes down below the wavelengths. In such pattern formation, a method of adding optical proximity correction (OPC) patterns is adopted. This method is a technique whereby a mask is formed so that the OPC patterns are added to the design data, the exposure is performed using this modified mask, and the manufactured actual pattern on the wafer is made to come close to the design data.

It is impossible for the conventional die-to-die comparison method to inspect whether or not the OPC patterns effectively serve as corrective modification for the pattern on the wafer. Therefore, a solution is required for this problem, for example, a method whereby the comparative examination between the pattern on the wafer and the design data can be performed considering an allowable pattern deformation quantity.

In addition, in a job shop type production (multi-product small-volume production) as is seen, for example, in a system on chip (SOC), a short delivery date is required. In such a case, even if the systematic defect is found at the electric inspection that is the final inspection, a quick countermeasure may not be taken to respond the short delivery time. As a countermeasure of this problem, there has arisen a requirement that the difference between the design data and the formed pattern is monitored in each step of the exposure process. Therefore, an inspection method whereby pattern deformation that doesn't affect the electrical characteristic is set as the allowable pattern deformation quantity and the comparative examination between the design data and the pattern on the wafer can be performed while allowing possible deformations that fall within the allowable pattern deformation quantity.

Moreover, design check is currently in practice using a software program, Lithosimulator, etc., as evaluation of the pattern deformation. In order to verify validity of this simulation, comparative examining devices for comparing between the pattern that litho-simulator outputs (simulation pattern) and the actual pattern are required.

It becomes still more important to improve the technology for circuit design by obtaining the pattern deformation quantity to the design data.

By the way, at present, a CD-SEM (Critical Dimension Scanning Electron Microscope) is used for controlling the pattern width of the wafer in the manufacturing process of semiconductor integrated circuits. This CD-SEM carries out automatic measurement of the line width of a line pattern at a specified position using a line profile for each transfer unit of the stepper called a shot. This measurement is performed for several positions for several shots on several pieces of the wafers for one lot, and whether or not a transfer function of the stepper is normal can be controlled in units of nm (nano meters).

As control items of the circuit pattern, shrink in an endpoint of the wiring, a position of an isolated pattern and the like are also important besides the line width, but the automatic measuring function of the CD-SEM accommodates only one dimensional measurement, that is, the CD-SEM can measure only the length such as the line width. Consequently, the measurement of those two-dimensional shapes is conducted by the operator's visual inspection of the images obtained by the CD-SEM or other microscopes.

Generally, the optical proximity effect correction (OPC) plays an important roll not only to secure the line width of the line pattern but also to form shapes of the corners and isolated patterns. Furthermore, because of improvement of an operating frequency, presently the control of the shape of a top end or base of the gate wiring pattern, called an end cap or a field extension, respectively, also becomes important in addition to the gate line width.

Such shape measurement of two-dimensional patterns as these is essential both in the sampling inspection in the manufacturing process and in a trial production phase, and especially in the trial production phase, it is thought to be requisite to inspect the pattern formation on the whole wafer.

However, the present situation is, as described above, that the control of the two-dimensional shape is done by a human work and hence automatization is needed from the point of view of accuracy and productivity.

SUMMARY OF THE INVENTION

Therefore, it is an object of the present invention to perform the comparative inspection between a pattern image to-be-inspected and a reference pattern in real time.

It is another object of the present invention to perform the matching between the pattern to-be-inspected and the reference pattern while allowing the shape difference that falls within an electrically allowable range.

Moreover, it is a still another object of the present invention to conduct stable defect detection.

Furthermore, it is another object of the present invention to enable the measurement of the two-dimensional pattern (pattern image to-be-inspected) that hitherto has been conducted on visual inspection to be executed quantitatively, rapidly and automatically.

With an intention of accomplishing the aforesaid objects, in the first aspect of the present invention, a pattern inspection apparatus according to the present invention is a pattern inspection apparatus for inspecting the pattern to-be-inspected by comparing it with a reference pattern, comprising: storage means for storing the reference pattern; inputting means for inputting an image of the pattern to-be-inspected; inspecting means for inspecting the pattern to-be-inspected by comparing an edge of the inputted image of the pattern to-be-inspected and an edge of the stored reference pattern; and outputting means for outputting a result of the inspection.

Here, the inspecting means may conduct matching between the pattern image to-be-inspected and the reference pattern by comparing the edge of the pattern image to-be-inspected and the edge of the reference pattern.

Here, the matching may be conducted by dilating the edge of the pattern image to-be-inspected.

Here, the matching may be conducted by dilating the edge of the reference pattern.

Here, the matching may be conducted by using the total sum of products of amplitudes of the edges of the pattern image to-be-inspected and amplitudes of the edges of the reference pattern at respective pixels as an evaluation value.

Here, the matching may be conducted by using the total sum of inner products of edge vectors of the pattern image to-be-inspected and edge vectors of the reference pattern at respective pixels or the total sum of absolute values of the inner products as an evaluation value, each of the edge vectors may have a magnitude equal to amplitude of the edge and a direction identical to the direction of the edge.

Here, the matching may be conducted by altering a weighting for each part of the reference pattern.

Here, the inspecting means may assume the correspondence of the edge of each pixel of the reference pattern to the edge of each pixel of the pattern image to-be-inspected.

Here, the correspondence-assumption may be conducted considering the distance between the edge of each pixel of the reference pattern and the edge of each pixel of the pattern image to-be-inspected and the directional difference between both the edges.

Here, the inspecting means may construct an area based on the edges of the pattern image to-be-inspected in which the inspecting means failed to assume the correspondence to the edges of the reference pattern, and recognize the area as a defective area.

Here, the inspecting means may construct an area based on the edges of the pattern image to-be-inspected in which the inspecting means succeeded in assuming the correspondence to the edges of the reference pattern, detect an area whose luminance distribution is non-uniform among the areas, and determine the area as a defective area.

Here, the inspecting means may judge a defect class based on geometrical feature quantities of the defective area.

Here, the inspecting means may judge a defect class based on a feature quantity concerning the luminance of the defective area.

Here, the inspecting means may calculate a pattern deformation quantity or pattern deformation quantities of the pattern to-be-inspected with respect to the reference pattern.

Here, the pattern deformation quantity may include at least one of a displacement quantity, a magnification variation quantity, and a dilation quantity of the line width.

Here, the inspecting means may add an attribute of the pattern to the reference pattern.

Here, the inspecting means may take a profile on the pattern image to-be-inspected, detect predetermined points for each the profile, approximate the detected points with a curve, and assume the curve to be an edge of the pattern image to-be-inspected.

In the second aspect of the present invention, a pattern inspection method according to the present invention is a pattern inspection method for inspecting a pattern to-be-inspected by comparing it with a reference pattern, comprising: an inputting step of inputting an image of the pattern to-be-inspected; an inspecting step of inspecting the pattern to-be-inspected by comparing an edge of the inputted image of the pattern to-be-inspected and an edge of the reference pattern stored in storage means; and an outputting step of outputting a result of the inspection.

In the third aspect of the present invention, a recording medium according to the present invention is a recording medium for recording a program that makes a computer execute a pattern inspection method for inspecting a pattern to-be-inspected by comparing it with a reference pattern and capable of being read by the computer, comprising: an inputting step of inputting an image of the pattern to-be-inspected; an inspecting step of inspecting the pattern to-be-inspected by comparing an edge of the inputted image of the pattern to-be-inspected and an edge of the reference pattern stored in storage means; and an outputting step of outputting a result of the inspection.

According to the foregoing construction, the comparative inspection between the pattern to-be-inspected and the reference pattern can be performed in real time.

Furthermore, matching can be conducted while allowing the shape difference that falls within electrically allowable range.

Moreover, stable defect detection can be conducted.

Furthermore, the measurement of two-dimensional patterns (pattern image to-be-inspected) that hitherto have been conducted on visual inspection can be executed quantitatively, rapidly and automatically.

The above and other objects, effects, features and advantages of the present invention will become more apparent from the following description of embodiments thereof taken in conjunction with the accompanying drawings.

BRIEF DESCRIPTION OF THE DRAWINGS

FIG. 14 is a diagram showing an example of an image (pattern image to-be-inspected) with contrast attached on the inside of the pattern and on the grounding;

FIG. 16 is a diagram showing an example of an image only whose profile is bright (the pattern image to-be-inspected);

FIG. 18 is a diagram showing an example of the edge amplitudes of a one-dimensional pattern image to-be-inspected;

FIG. 19 is a diagram showing an example where the edges of FIG. 18 were dilated;

FIG. 20 is a diagram showing an example of the amplitudes of the edges of the one-dimensional reference pattern;

FIG. 21 is a diagram showing another example where the edges of FIG. 18 were dilated;

FIG. 22 is a diagram showing another example of the edge amplitudes of the one-dimensional reference pattern;

FIG. 23 is a diagram showing another example where the edges of FIG. 18 were dilated;

FIG. 24 is a diagram showing an example of a smoothing filter:

DETAILED DESCRIPTION OF PREFERRED EMBODIMENTS

Figure 1:
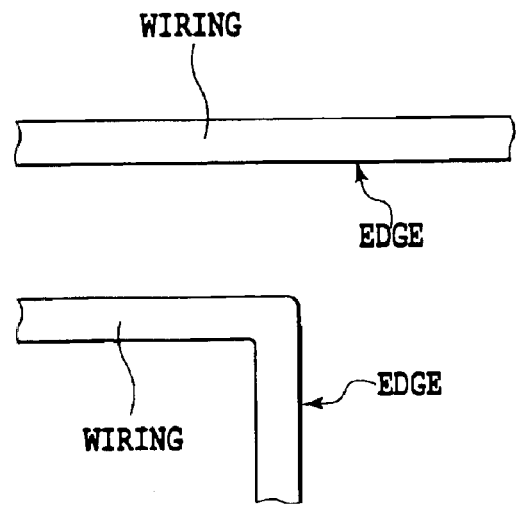
FIG. 1 is a diagram showing an example of a theoretical pattern based on the design data.

Hereafter, referring to the drawings, preferred embodiments of the present invention will be described in detail.

Figure 2:
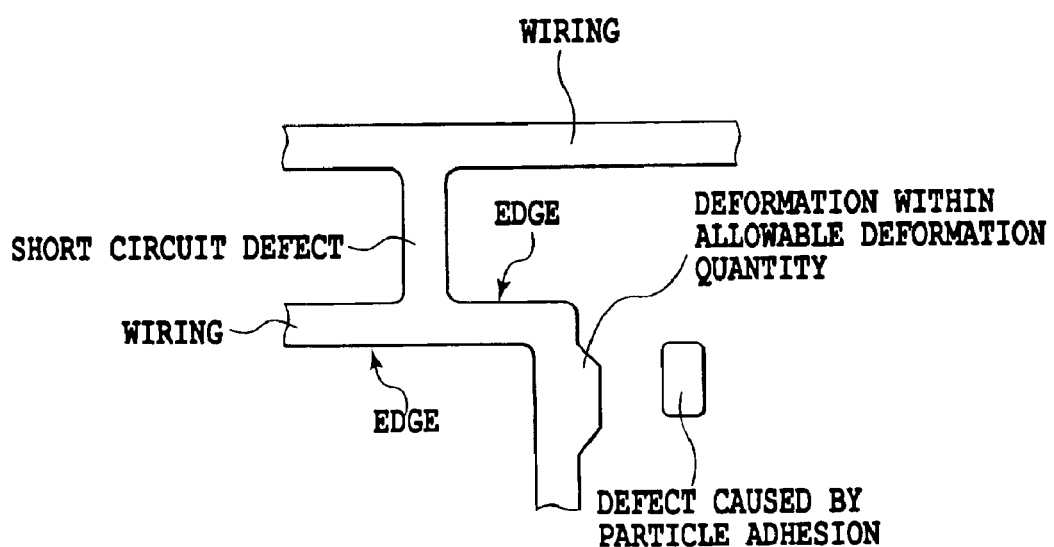
FIG. 2 is a diagram showing an example of a pattern that was actually manufactured according to the design data.

FIG. 1 is a diagram showing an example of a theoretical pattern based on the design data, and FIG. 2 is a diagram showing an example of a pattern actually manufactured based on the design data (actual pattern). As shown in FIG. 2, the actual pattern may have a short circuit defect, a defect caused by particle adhesion, and a deformation within the allowable pattern deformation quantity. Therefore, the actual pattern becomes somewhat different from the pattern theoretically obtained on the basis of the design data.

A pattern inspection apparatus according to this embodiment performs the inspection by comparing a pattern to-be-inspected (for example, the pattern shown in FIG. 2) with a reference pattern (for example, the pattern shown in FIG. 1).

Figure 3:
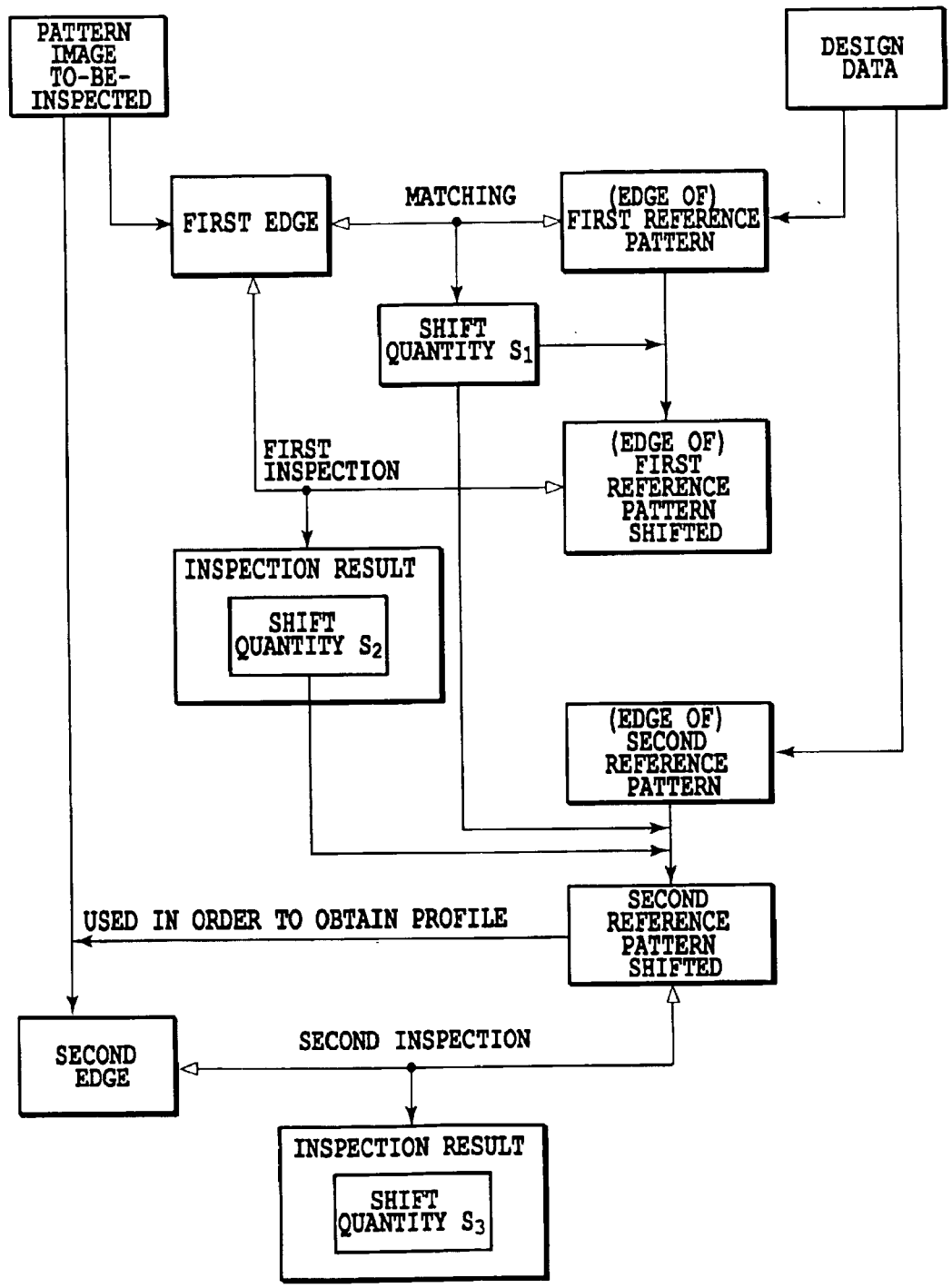
FIG. 3 is a diagram showing the outline of the inspection processing that a pattern inspection apparatus according to one embodiment of the present invention carries out.

FIG. 3 is a diagram showing the outline of the inspection processing which the pattern inspection apparatus according to this embodiment performs. At the first stage of inspection processing, the first edges are detected from the pattern image to-be-inspected. Then, by comparing the first edge and the edge of the first reference pattern, the matching between the pattern image to-be-inspected and the reference pattern is performed. As a result of the matching, the shift quantity $S_1$ is obtained, and the first reference pattern is shifted by this shift quantity $S_1$. Subsequently, by comparing the first edge and the first reference pattern so shifted, the pattern to-be-inspected (actual pattern) is inspected. At this first stage of inspection, the pattern deformation quantity is obtained and the defect is detected. The shift quantity $S_2$ is obtained as one of the pattern deformation quantities.

Then, in order to detect the second edges from the pattern image to-be-inspected, the corresponding second reference pattern is shifted by the shift quantity $S_1+S_2$ Using the second reference pattern so shifted, profiles are obtained on the pattern image to-be-inspected and the second edges are detected. Then, by comparing the second edge and the edge of the second reference pattern so shifted, the pattern to-be-inspected is inspected. Also at this second stage of inspection, the pattern deformation quantity is obtained and the defect is detected. The shift quantity $S_3$ is obtained as one of the pattern deformation quantities.

Figure 4:
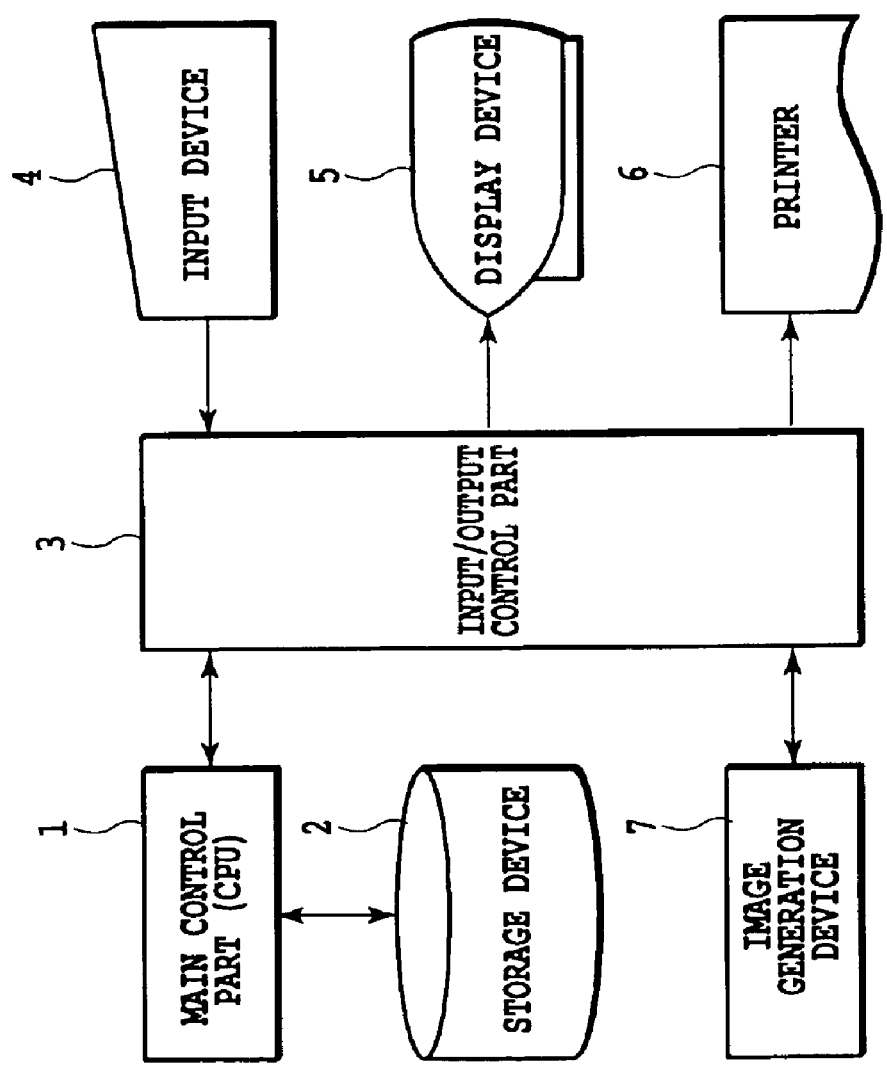
FIG. 4 is a diagram showing an example of hardware construction of the pattern inspection apparatus according to the embodiment of the present invention.

FIG. 4 is a diagram showing an example of hardware configuration of the pattern inspection apparatus in this embodiment. The pattern inspection apparatus according to this embodiment comprises a main control part 1, a storage device 2, an input/output control part 3, an input device 4, a display device 5, a printer 6, and an image generation device 7.

The main control part 1 is composed of a CPU and the like, and manages and controls the whole apparatus. The main control part 1 is connected with the storage device 2. The storage device 2 can take a form of a hard disk drive, a flexible disk drive, an optical disc drive, or the like. Moreover, to the main control part 1, connected are: the input device 4 such as a keyboard, a mouse, etc.; the display device 5 such as a display for displaying the input data, calculation results, etc.; and the printer 6 such as a printer for printing the calculation results and the like.

The main control part 1 has a control program such as an OS (Operating System), a program for the pattern inspection, and an internal memory (internal storage device) for storing necessary data and the like, and realize the pattern inspection with these programs and the like. It can be possible that these programs are initially stored in a floppy disk, a CD-ROM disc, etc., read and stored in a memory, a hard disk, or the like before execution, and then executed.

Figure 5:
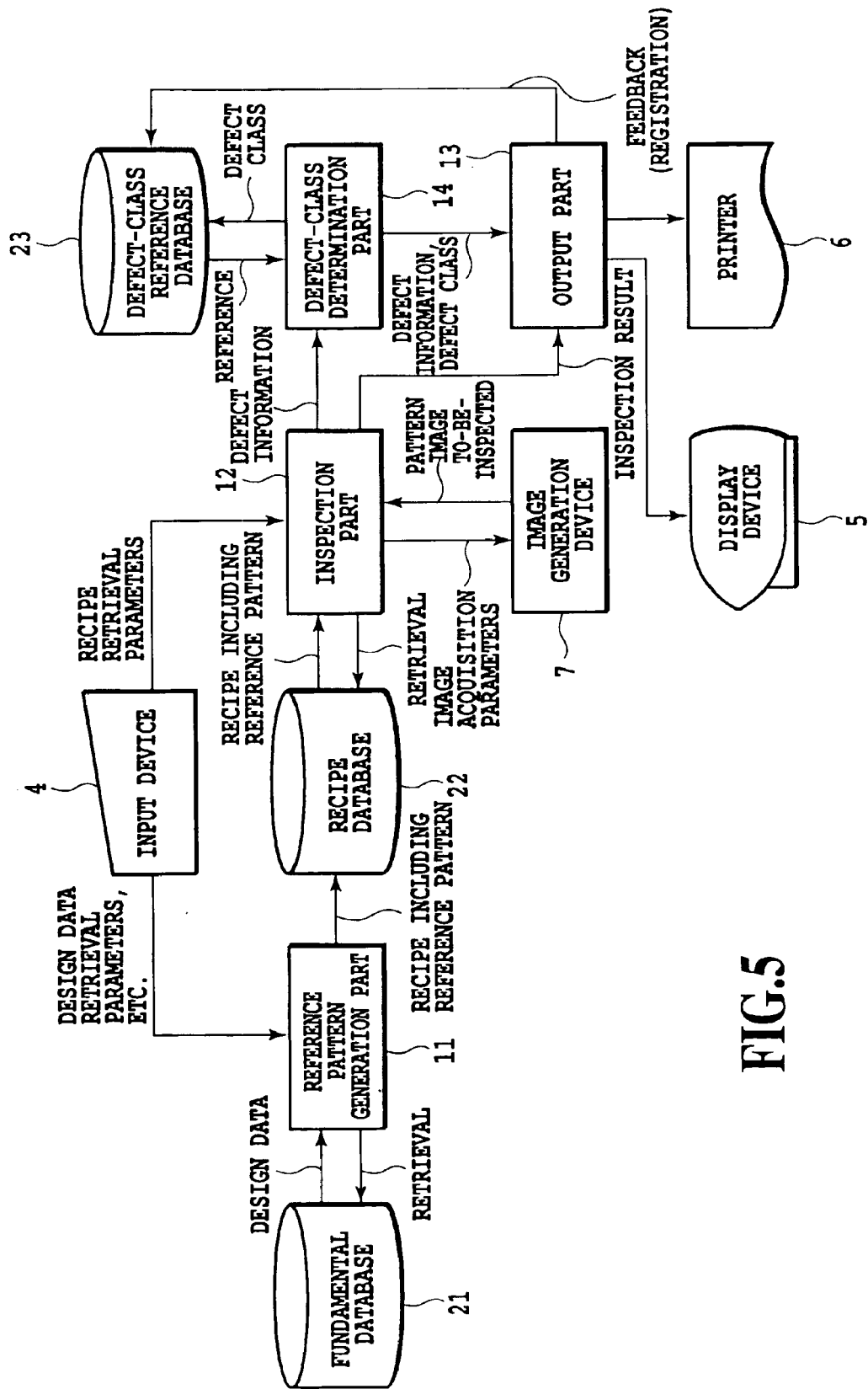
FIG. 5 is a diagram showing the functional block diagram of the pattern inspection apparatus according to the embodiment of the present invention.

FIG. 5 is a diagram showing a functional block diagram of the pattern inspection apparatus in this embodiment. A reference pattern generation part 11, a retrieval part 12, an output part 13, and a defect-class determination part 14 are all realized by programs. A fundamental database 21, a recipe database 22, and a defect-class reference database 23 are provided in the storage device 2.

Alternatively, the fundamental database 21 may be provided outside the storage device 2 and the pattern inspection apparatus may access the fundamental database 21 through the LAN.

(Recipe)

Before the inspection, first, a set of inspection parameters called a recipe is set. Among the parameters are the distance between the pixels on the actual pattern (pixel distance) when acquiring the pattern image to-be-inspected that is the object of the inspection, the number of pixels, such as 512×512, 1024×1024, etc. From these values, the distance on the actual pattern of the image (image size) that is to be processed collectively can be grasped. Moreover, the parameters for detecting the edge and the parameters for determining the defect are set.

As data to be compared with the pattern image to-be-inspected, the design data is used. As an example of this design data, CAD layout data in a GDS format is modified through layer-merging or fracturing. In this embodiment, a bundle of line segments obtained by this processing is clipped with a rectangular area whose one side is equal to the side of the image size plus an error of the stage and the maximum parallel shift quantity of the pattern to define the reference pattern, which is stored in the recipe database 22 beforehand. If the error of the stage can be neglected compared to the maximum parallel shift quantity of the pattern, the absolute coordinate values of the pattern deformation can be measured. In this embodiment, the reference pattern is set to be larger than the pattern image to-be-inspected considering the error of the stage and the maximum parallel shift quantity of the pattern to perform the processing. Alternatively, the pattern image to-be-inspected may be set to be larger than the reference pattern to perform the processing.

Figure 7:
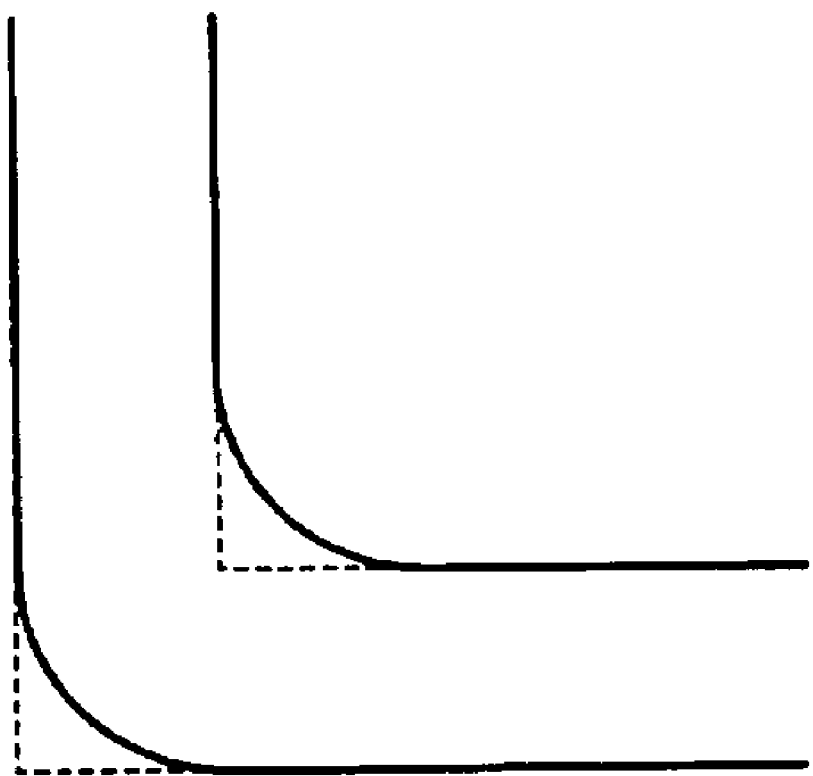
FIG. 7 is a diagram showing an example of the correction of a reference pattern.

The corners of the reference pattern may undergo rounding processing. As shown in FIG. 7, normally the design data consists of polygons having acute angles (dotted lines in the figure), whereas circuit patterns actually formed have rounded corners. To make up this difference, the corners may be corrected so as to come close to the actual patterns by applying a circle, an ellipse, a straight line, or a curve described by other method to the corner parts.

If the design data is used as the reference pattern, the comparison becomes defect inspection where the actual pattern image undergoes the comparative inspection to the pattern that the designer wishes to realize. In this case, the allowable quantity that won't cause an effect on the electrical characteristic is set as the allowable pattern deformation quantity. This pattern deformation quantity may be set for each attribute of the wiring, and furthermore may be altered for a portion where the patterns are crowded and for a portion where it is not so.

If a curve (solid lines in FIG. 50) demarcating the shape of the exposed pattern obtained by litho-simulator is used as the reference pattern, the defect inspection can be performed while the validity of the simulation is being examined. Output data of a litho-simulator is a light intensity distribution obtained through optical simulation. The curves of the shape are obtained from this distribution. For the allowable pattern deformation in this case, an error that is allowed in the simulation is set.

In this embodiment, the design data is used as the reference pattern.

Figure 6:
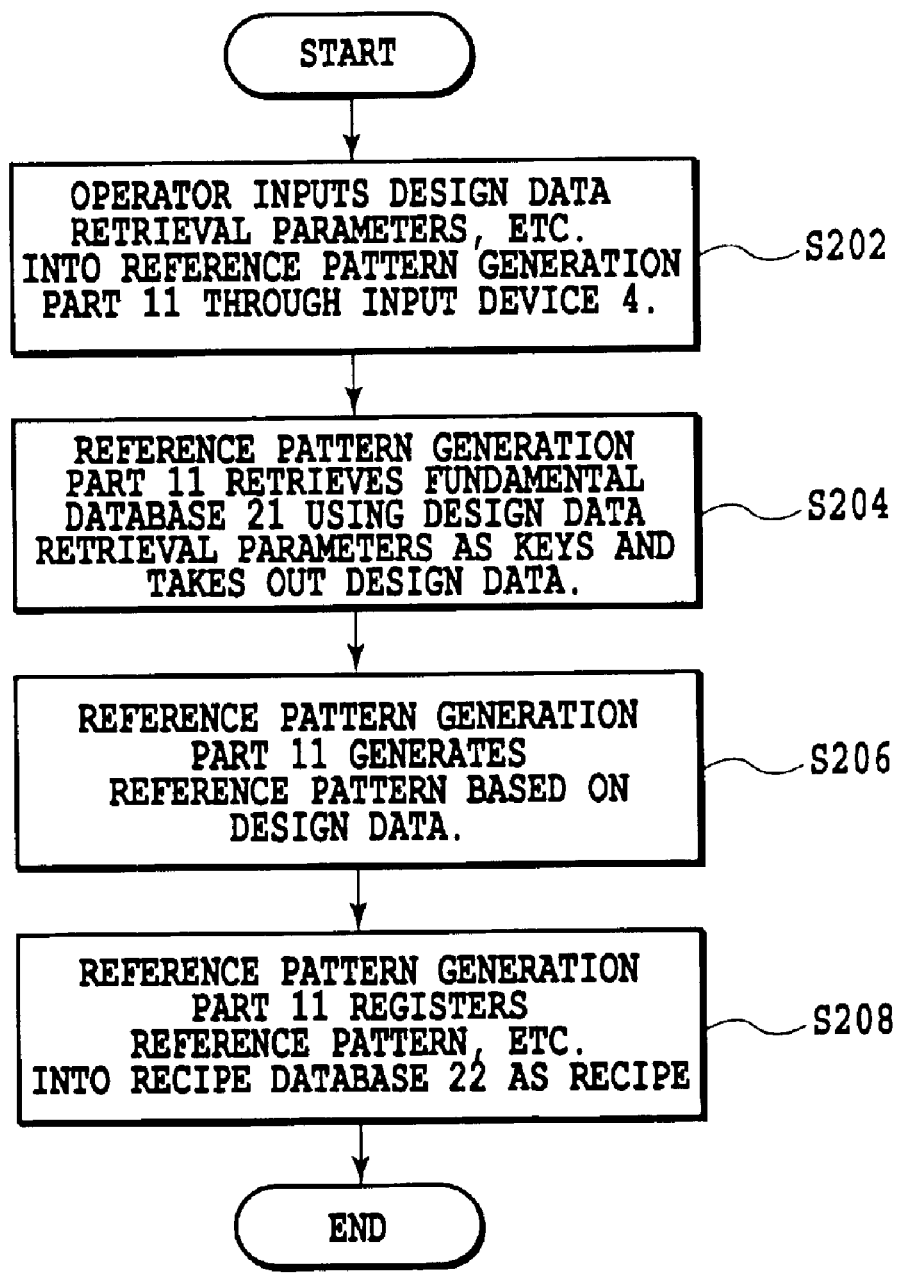
FIG. 6 is a flowchart showing an example of recipe registration processing in the embodiment according to the present invention.

FIG. 6 is a flowchart showing an example of recipe registration processing in this embodiment. First, the operator inputs parameters into the reference pattern generation part 11 via the input device 4, the parameters being for retrieving design data (here, parameters for specifying the kind of a sample to-be-inspected and the process), inspection mode, image acquisition parameters (inspection area, image size, the number of pixels, slot number for specifying the wafer, and adjustment parameters of the optical system), and parameters for detecting and inspecting the edge (step S202).

As parameters for detecting and inspecting the edge, the following information is set:

(R1) Pattern deformation quantities to calculate (R2) Limits of the negative side and the positive side of the allowable pattern deformation quantity and a limit of the allowable directional difference of the edge (R3) Parameters of the edge detection, which are empirically determined from the image quality (R4) An extraction rule for automatically determining the attribute of the pattern (corner, straight part, end point, isolated pattern, etc.)

(R5) A length of the profile acquisition section, an interval between the profile acquisition sections, an interval between positions where the luminance is checked in the profile acquisition section, a method for taking the profile (whether or not the threshold method is used and the like)

(R6) A flag for indicating whether or not the profile acquisition sections are set to be variable and are to be determined when measuring The reference pattern generation part 11 retrieves the fundamental database 21 using design data retrieval parameters (the kind of the sample to-be-inspected and the process) as keys and takes out the design data (step S204). The fundamental database 21 is a database that stores the design data (CAD data) corresponding to the pattern image to-be-inspected.

Next, the reference pattern generation part 11 generates the reference pattern based on the design data (step S206).

In this step, there may be the necessity of modifying the design data so as to become best fitted to the position of the edge that are detected from the pattern image to-be-inspected by conducting shrink processing (processing where the magnification of the pattern image is altered), size processing (processing where the line width is altered), etc., on the design data. Furthermore, since the position of the edge to-be-detected is generally different in the first edge detection and in the second edge detection, if necessary, two kinds of the reference patterns are prepared for the first edge detection and for the second edge detection.

Since the inspection is performed for each inspection unit area that is obtained through the division of the inputted area to-be-inspected by an image size, the reference pattern is generated in accordance with the inspection unit area. The inspection includes a sequential inspection and a random inspection.

Figure 8:
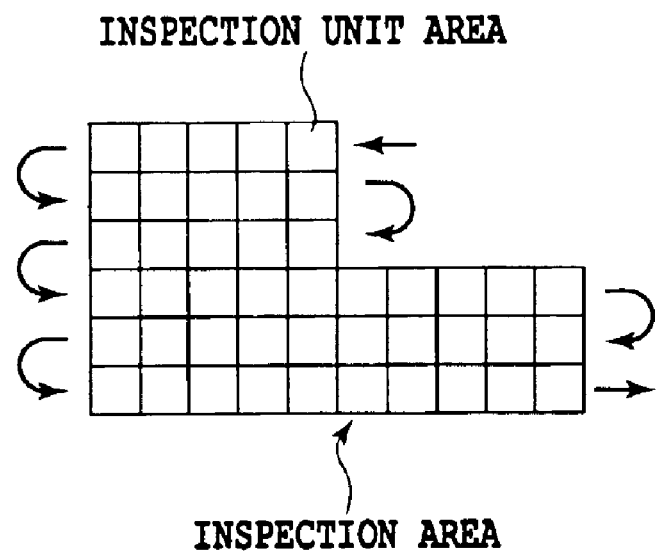
FIG. 8 is a diagram for explaining a sequential inspection.

FIG. 8 is a diagram for explaining the sequential inspection. The inspection area is normally determined as a sum of rectangles. That is, since the inspection area is not set on the whole wafer but on a plurality of areas each of which is specified by a rectangle (the upper short rectangle, the lower long rectangle, etc. as in FIG. 8), the sequential scanning is executed for each inspection unit area in order to perform a high-speed inspection on that area. The reference pattern is created for each inspection unit area.

Figure 9:
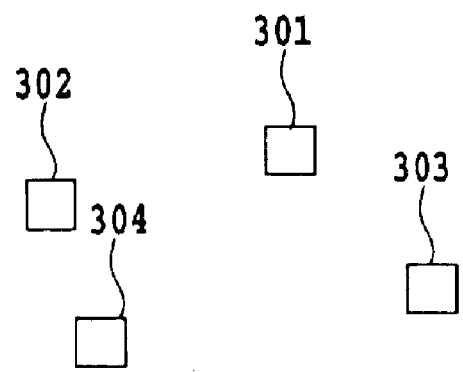
FIG. 9 is a diagram for explaining a random inspection.

FIG. 9 is a diagram for explaining the random inspection. In the random inspection, a certain area is not inspected sequentially but inspected in a pinpoint manner. In FIG. 9, only the inspection unit areas 301 to 304 are inspected.

Figure 10:
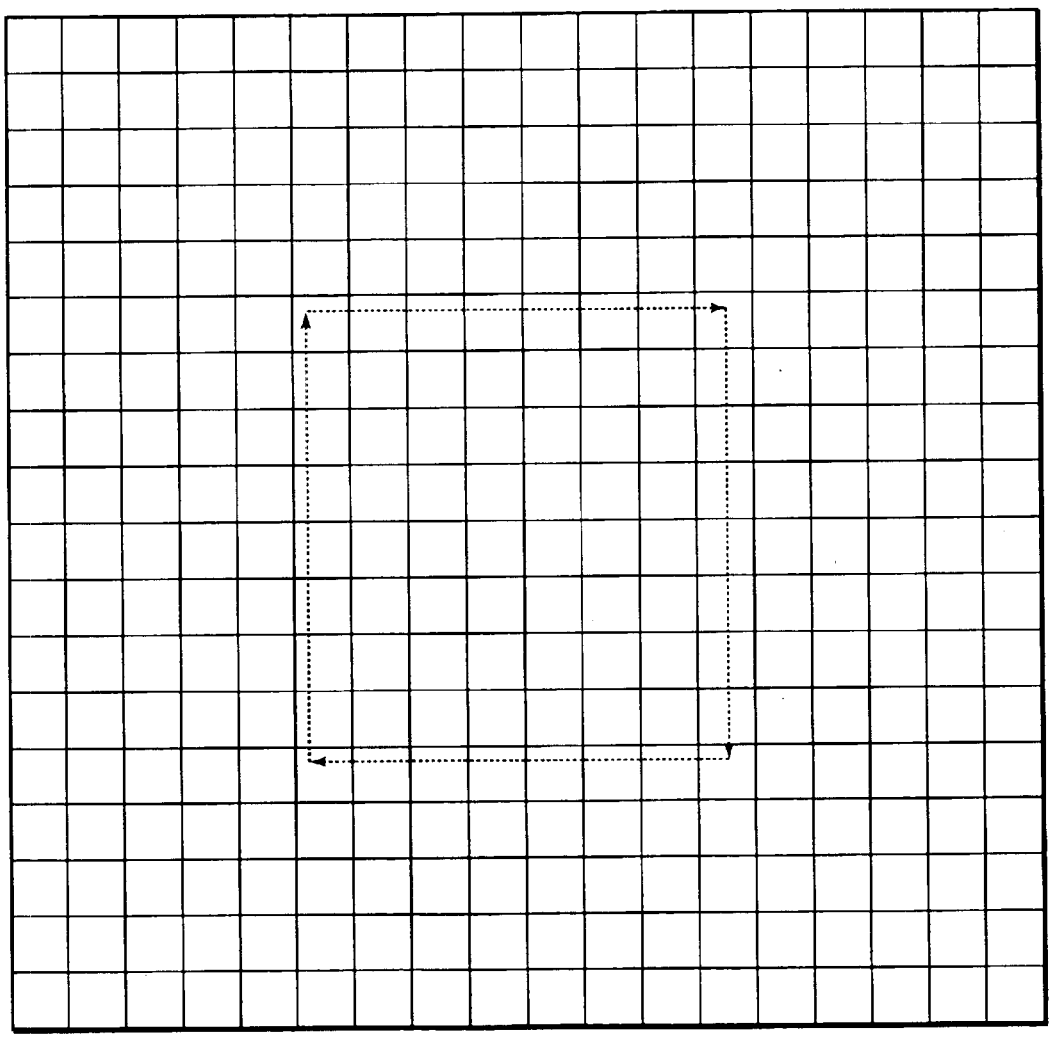
FIG. 10 is a diagram showing an example of the reference pattern.
Figure 11:
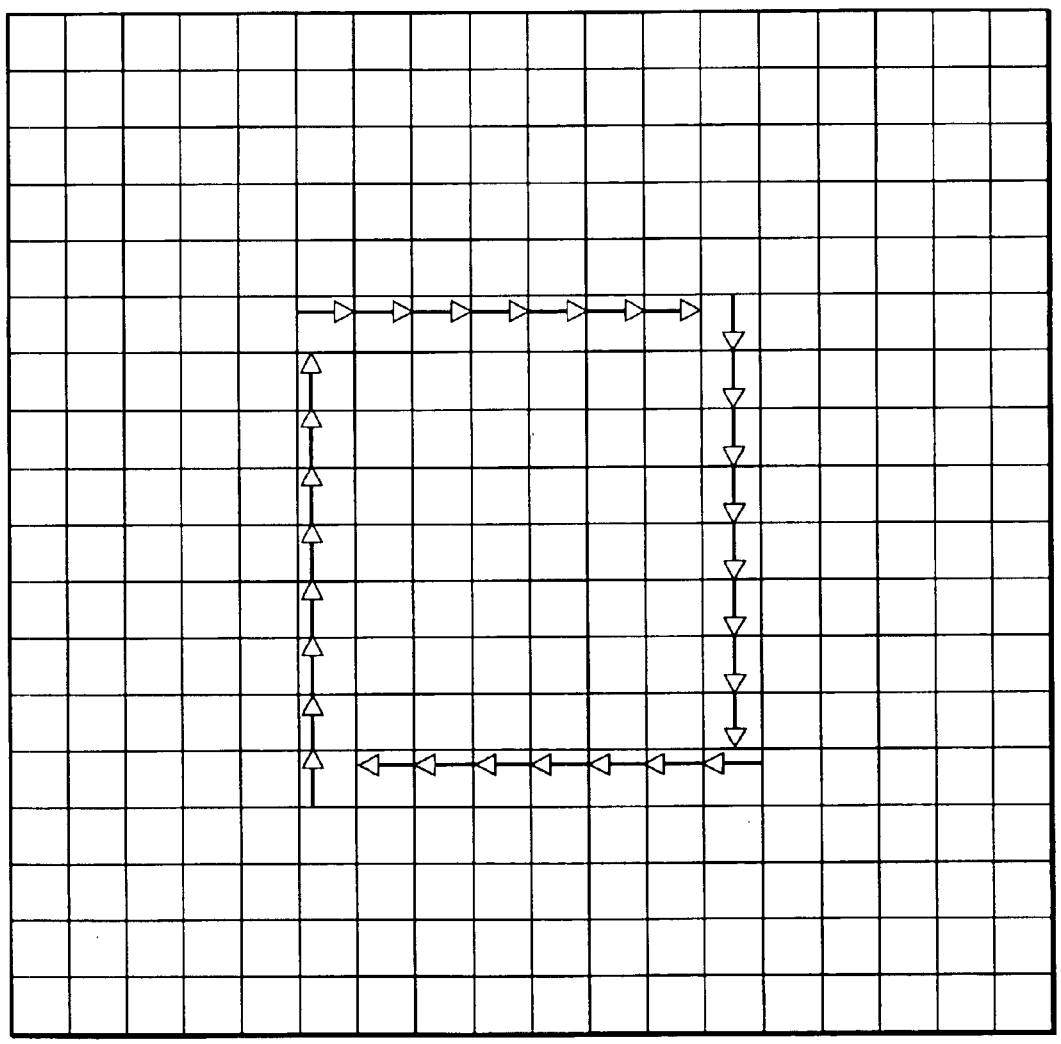
FIG. 11 is a diagram showing an example where the reference pattern of FIG. 10 is converted into edge vectors for respective pixels.

FIG. 10 is a diagram showing an example of the reference pattern, and FIG. 11 is a diagram showing an example where the reference pattern of FIG. 10 is converted into the edges vectors for respective pixels. In FIG. 10, the reference pattern (dotted lines) is shown with a sub pixel accuracy. Normally, the edge direction of the reference pattern is parallel to a lateral direction (x-direction) or a longitudinal direction (y-direction) of the pixel. The edge of the reference pattern, similarly to the edge of the pattern image to-be-inspected, has information of a starting point (with a sub pixel accuracy), a direction, and the amplitude for each pixel. In this embodiment, the edge amplitude of the reference pattern is set to unity for all pixels.

Figure 12:
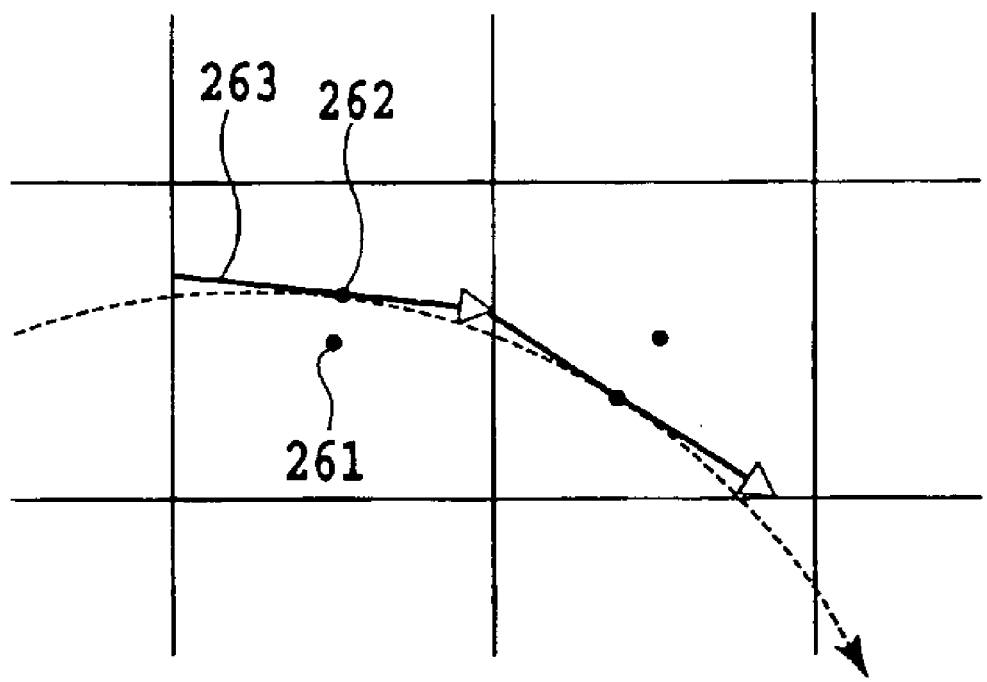
FIG. 12 is a diagram showing an example where the reference pattern including a curve is converted into the edge vectors.
Figure 13A:
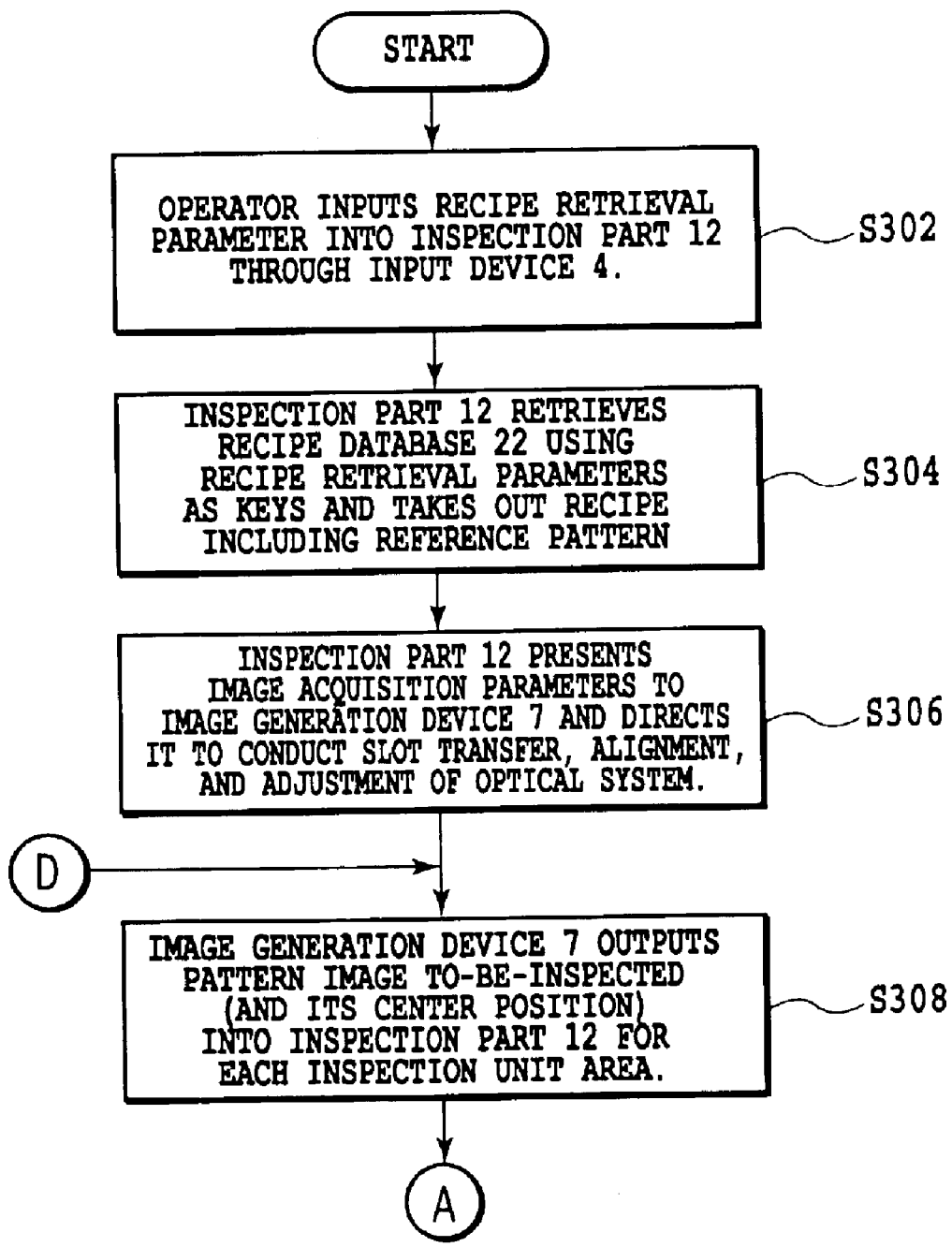
FIGS. 13A through 13D are a flowchart showing an example of the inspection processing in the embodiment according to the present invention.
Figure 13B:
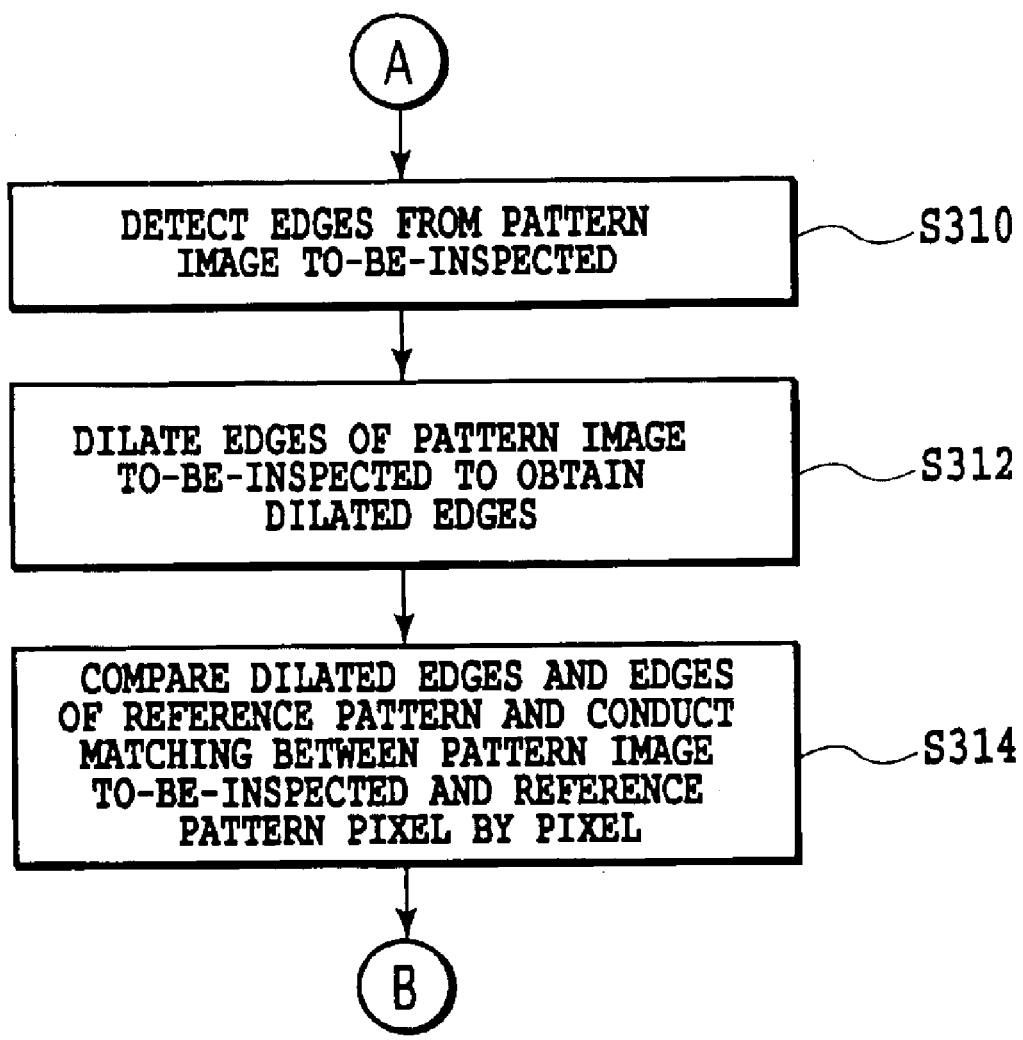
Figure 13C:
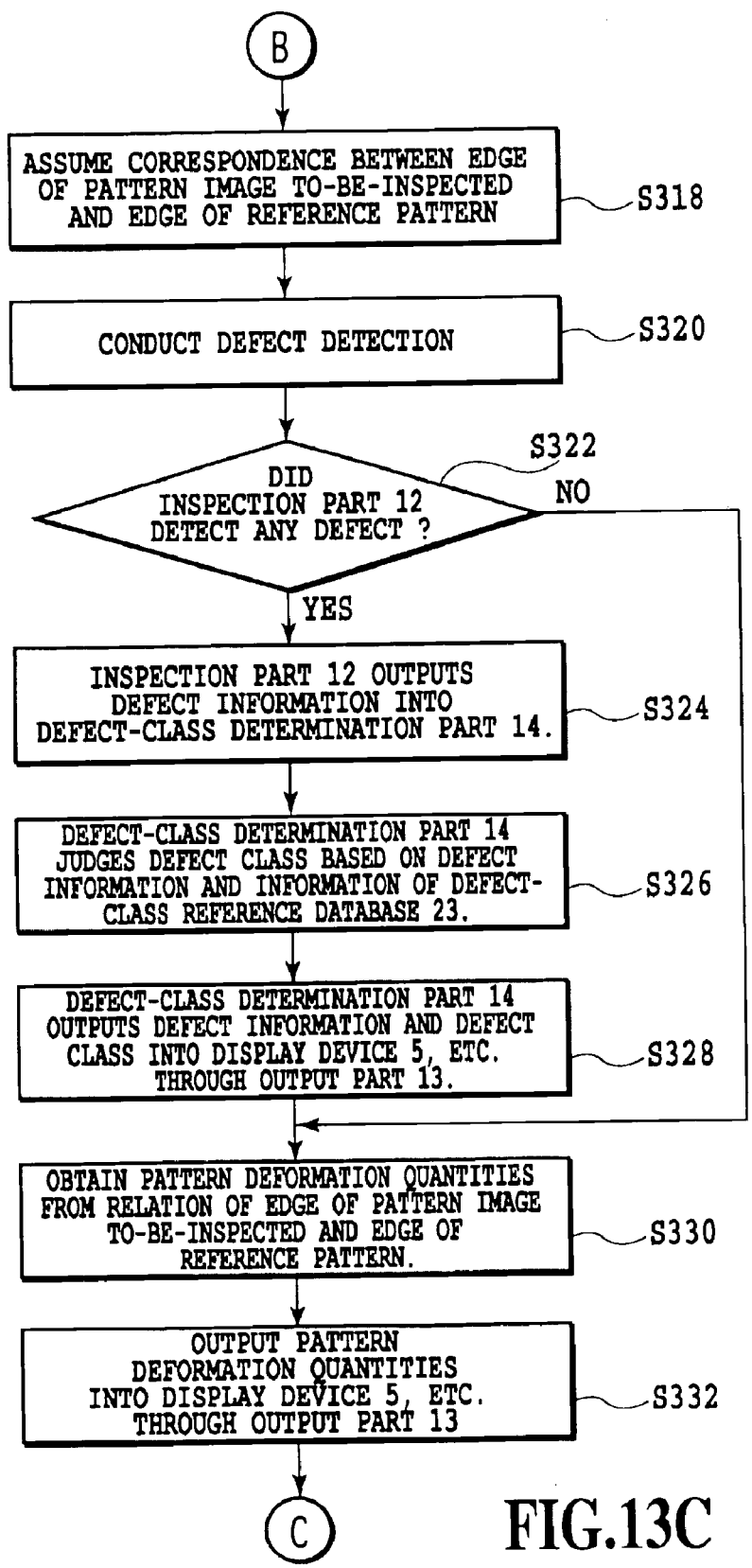
Figure 13D:
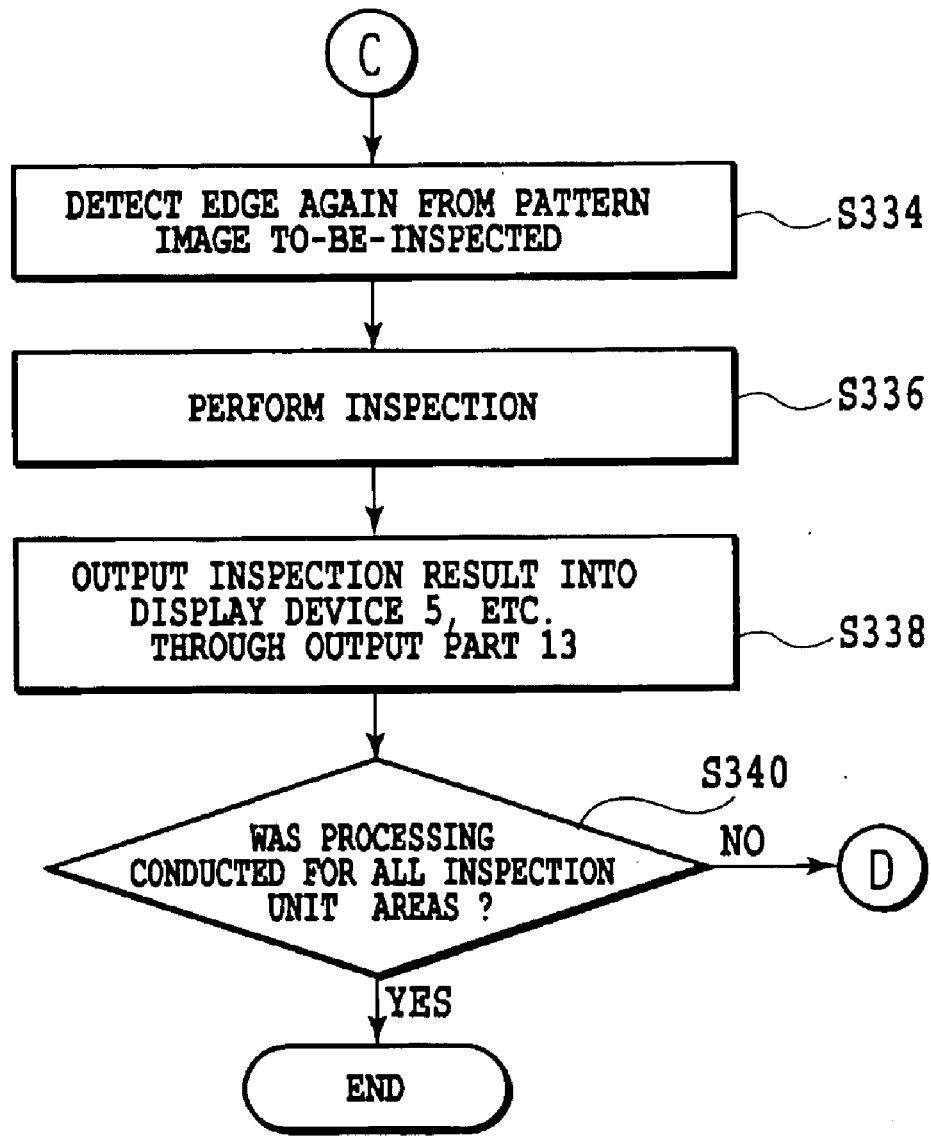

As shown in FIG. 12, the reference pattern may include a curve. For converting the reference pattern including the curve into the edge vector, there is, for example, a method where a tangent line 263 at a point 262 that is on the reference pattern and closest to the center 261 of the pixel is taken as the edge vector.

Next, the reference pattern generation part 11 registers the reference pattern, the kind of the sample to-be-inspected, the process, the inspection mode, the image acquisition parameters, and the parameters for detecting and inspecting the edge in the recipe database 22 (step S208). These data are called a recipe which is a set of inspection parameters and are controlled using the kind, the process, and the inspection mode as the keys.

(Inspection Processing)

FIGS. 13A through 13D is a flowchart showing an example of the inspection processing in this embodiment. First, the operator inputs recipe retrieval parameters (in this case, the kind, the process, and the inspection mode) into the inspection part 12 through the input device 4 (step S302).

The inspection part 12 retrieves the recipe database 22 using the recipe retrieval parameters as the keys and takes out the recipe (step S304). Then, in order to acquire the pattern image to-be-inspected (optical image, electron beam image, focused ion beam image, probe microscope image, etc.), the inspection part 12 presents the image acquisition parameters to the image generation device 7 and directs it to conduct slot transfer, alignment, and adjustment of an optical system (step S306). Here, the alignment means a function of obtaining a conversion coefficient between the coordinate axes that the CAD data uses and the coordinate values wherewith an observation position of the real wafer is controlled. This function has been embodied by CAD navigation. The CAD navigation is a well-known method whereby, after the alignment, the coordinate values of the position on the CAD data where the operator wishes to observe are converted into the coordinate values for controlling the observation point of the real wafer, the field of view of a picture-taking apparatus is moved to that position, and the image at the position is acquired.

For the image generation device 7, a wafer defect inspection apparatus which is normally used, the CD-SEM, or various microscopes can be used.

The image generation device 7 outputs the pattern image to-be-inspected (and its center position) into the inspection part 12 for each inspection unit area (step S308).

(The First Edge Detection)

Next, the inspection part 12 conducts the first edge detection from the pattern image to-be-inspected (step S310). For the edge detection, there are, for example, the following two techniques.

(A) One is a technique suitable for the case where the contrast exists between the inside of the pattern and the grounding. In many of such images, the edges can be detected through binarization processing, but in the case where the contrast is relatively indistinct, the edges cannot be detected clearly. In this case, for example, by applying a method disclosed in the literature [reference 1]: R. M. Haralick, "Digital step edges from ZERO crossing of second directional derivatives," IEEE Trans. Pattern Anal. Machine Intell., vol. PAMI-6. No. 1, pp. 58–68, 1984 or by other method, the edges can be obtained. With this method, a point of inflection on the edge part can be obtained with an accuracy of one tenth times the pixel unit or so.

(B) The other one is a technique that can cope with the case where there exists virtually no contrast between the inside of the pattern and the grounding. That is, for example, by a method disclosed in the literature [reference 2]: Cartan Steger, "An unbiased detector of curvilinear structures," IEEE Trans. Pattern Anal. Machine Intell., vol. 20, No. 2, February 1998, the edges are obtained. With this method, a peak of the edge can be obtained with an accuracy of one-tenth times pixel unit or so. However, in this technique, the edge direction has only a value of 0 to 180 degrees. That is, the inside of the pattern cannot be specified.

In the case where there exists the contrast between the inside of the pattern and the grounding, the image may undergo the operation with a differential filter (for example, Sobel filter or a band-pass filter) to generate an edge amplitude image, which may be used to obtain the edge by the aforesaid method. In this case, the inside of the pattern can be judged and the edge direction can be specified.

Since these methods are processing with the use of a rather large window, not only can an accuracy of one-tenth times the pixel unit or so be obtained, but also can the edge direction be obtained stably. This means that there is not necessarily a need of concatenating the edge positions to conduct the linear approximation.

At the edge detection of step S310, the edge amplitude and edge direction are obtained from the pattern image to-be-inspected for each pixel. The sharper the edge is, the larger the amplitude becomes. (A) When the image is such that the contrast exists between the inside of the pattern and the grounding, for example, using the method of the above-described reference 1, the absolute value of the first derivative of the image can be set as the amplitude, and the zero cross point of the second derivative of the image can be set as the edge position. On the other hand, (B) when the image is such that only the edge is bright, for example, using the method of the above-described reference 2, a sign-inverted value (absolute value) of the second derivative of the image can be set as the amplitude, and the zero cross point of the first derivative of the image can be set as the edge position. In either case, the edge can be obtained with a sub pixel accuracy. In the case of the image of (A), the direction of 0 to 360 degrees can be defined, whereas in the case of the image of (B), only the direction of 0 to 180 degrees can be defined. This results from a fact that, in the image of (B), the inside of the pattern cannot be specified from local information.

Figure 15:
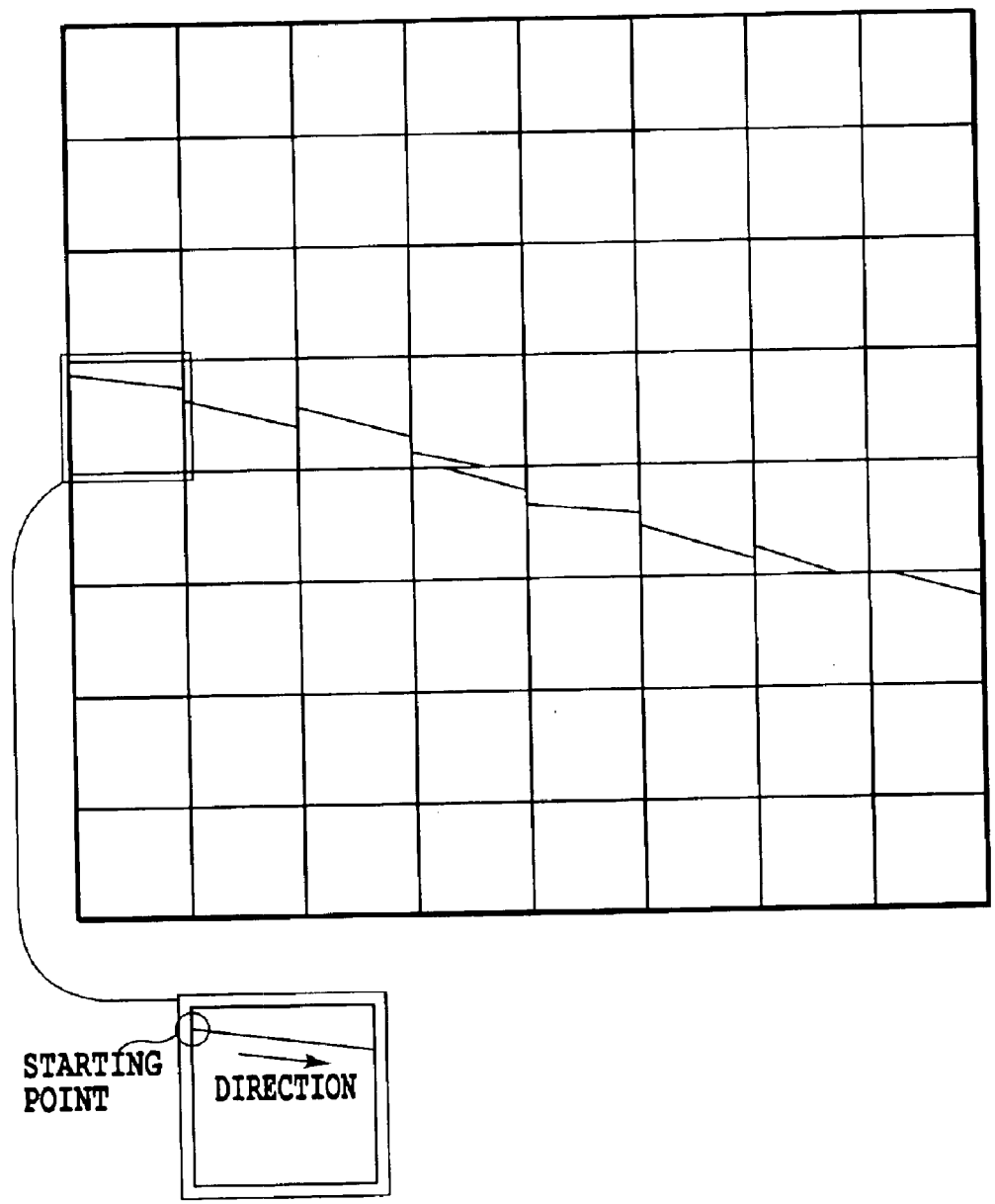
FIG. 15 is a diagram showing edges detected from the image of FIG. 14.

FIG. 14 is a diagram showing an example of (A) an image having the contrast between the inside of the pattern and the grounding (pattern image to-be-inspected) and FIG. 15 is a diagram showing the edges detected from the image of FIG. 14. In FIG. 14, the luminance value is shown for each pixel. As shown in FIG. 15, the edge is detected for each pixel and information of a starting point (with a sub pixel accuracy), the direction (in 0 to 360 degrees), and the amplitude can be obtained for each pixel. As described above, the sharper the edge is, the larger the amplitude becomes.

Figure 17:
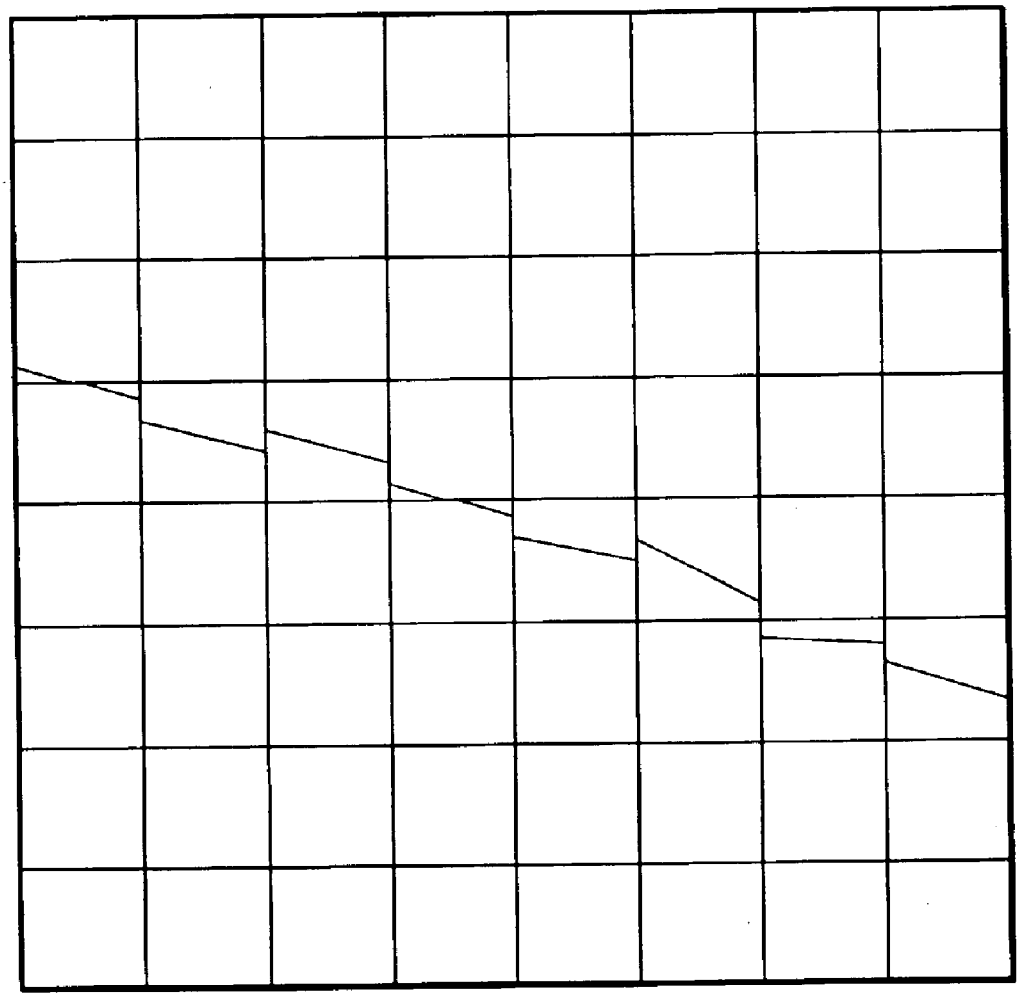
FIG. 17 is a diagram showing the edges detected from the image of FIG. 16.

FIG. 16 is a diagram showing an example of (B) an image only whose edge is bright (pattern image to-be-inspected) and FIG. 17 is a diagram showing the edges detected from the image of FIG. 16. Also in FIG. 16, the luminance value is shown for each pixel. Furthermore, as shown in FIG. 17, the edge is detected for each pixel and the information of the starting point (with a sub pixel accuracy), the direction (in 0 to 180 degrees), and the amplitude can be obtained for each pixel.

(Matching)

Next, the inspection part 12 dilates the edges of the pattern image to-be-inspected to obtain dilated edges (step S312). In this embodiment, the edges are dilated by the allowable pattern deformation quantity that is allowed in terms of electrical characteristic. In this stage, the allowable pattern deformation quantity is a positive integer. If (R2) "limits of the negative side and the positive side of the allowable pattern deformation quantity" are different, this value is one that has a larger absolute value and is rounded into an integer. By dilating the edge by the allowable pattern deformation quantity, the matching can be conducted while allowing the shape difference that falls within an electrically allowable range.

FIG. 18 is a diagram showing the edge amplitudes of the one-dimensional pattern image to-be-inspected and FIG. 19 is a diagram showing an example where the edges of FIG. 18 are dilated. FIG. 18 and FIG. 19, to make the explanation simple, show the example of the case where the pattern image to-be-inspected is one-dimensional and the edge amplitude possessed by each pixel is a scalar value. When treating the deformation within the allowable pattern deformation quantity equally, the pattern image to-be-inspected is processed with a maximum value filter having a window twice as large as the allowable pattern deformation quantity. Here, the maximum filter means one whereby the maximum value among values possessed by neighboring pixels of the target pixel and within a window centered at the target pixel is obtained, and the value is assumed to the value of the target pixel after the filter operation. In FIG. 19, the edges of FIG. 18 are dilated rightward and leftward by 2 pixels, respectively. This is an example for the case where the allowable pattern deformation quantity is two pixels.

In contrast to this situation, the edges of the reference pattern are as in FIG. 20. If the evaluation value (degree) of the matching is obtained from FIG. 19 and FIG. 20, the evaluation value of the matching becomes the same both for the case where the pattern image to-be-inspected is located at the present position and for the case where the pattern image to-be-inspected is displaced rightward or leftward by one pixel or two pixels.

To circumvent this, it is recommended that the edge should be dilated with weightings given on the neighboring pixels as shown in FIG. 21. This way of setting weightings signifies such matching that the smaller the allowable pattern deformation quantity is, the better the evaluation value becomes. In order to realize the dilation of FIG. 21, a smoothing filter consisting of 0.5, 0.75, 1.0, 0.75, and 0.5 coefficients may be used. In FIG. 21, when the pattern image to-be-inspected displaces rightward or leftward even by one pixel, the evaluation value will decrease.

Here, as shown in FIG. 22, assume that the edges of the reference pattern is wider than the present edges by two pixels. If the evaluation value is calculated from FIG. 21 and FIG. 22, the same evaluation value is obtained both for the case where the pattern image to-be-inspected exists as it is and for the case where the pattern image is displaced rightward or leftward by one pixel.

All that is needed to circumvent this is only to dilate the edge with weightings given as shown in FIG. 23. In order to realize the dilation of FIG. 23, it is recommended that a smoothing filter consisting of 0.5, 0.9, 1.0, 0.9, and 0.5 coefficients (FIG. 24) should be used. Coefficients of the smoothing filter should be obtained experimentally.

In light of the foregoing, the dilation as shown in FIG. 23 is desirable, but from the point of view of the processing speed, crowdedness of the edges, etc., the dilation as shown in FIG. 19 or FIG. 21 may be used.

Figure 25:
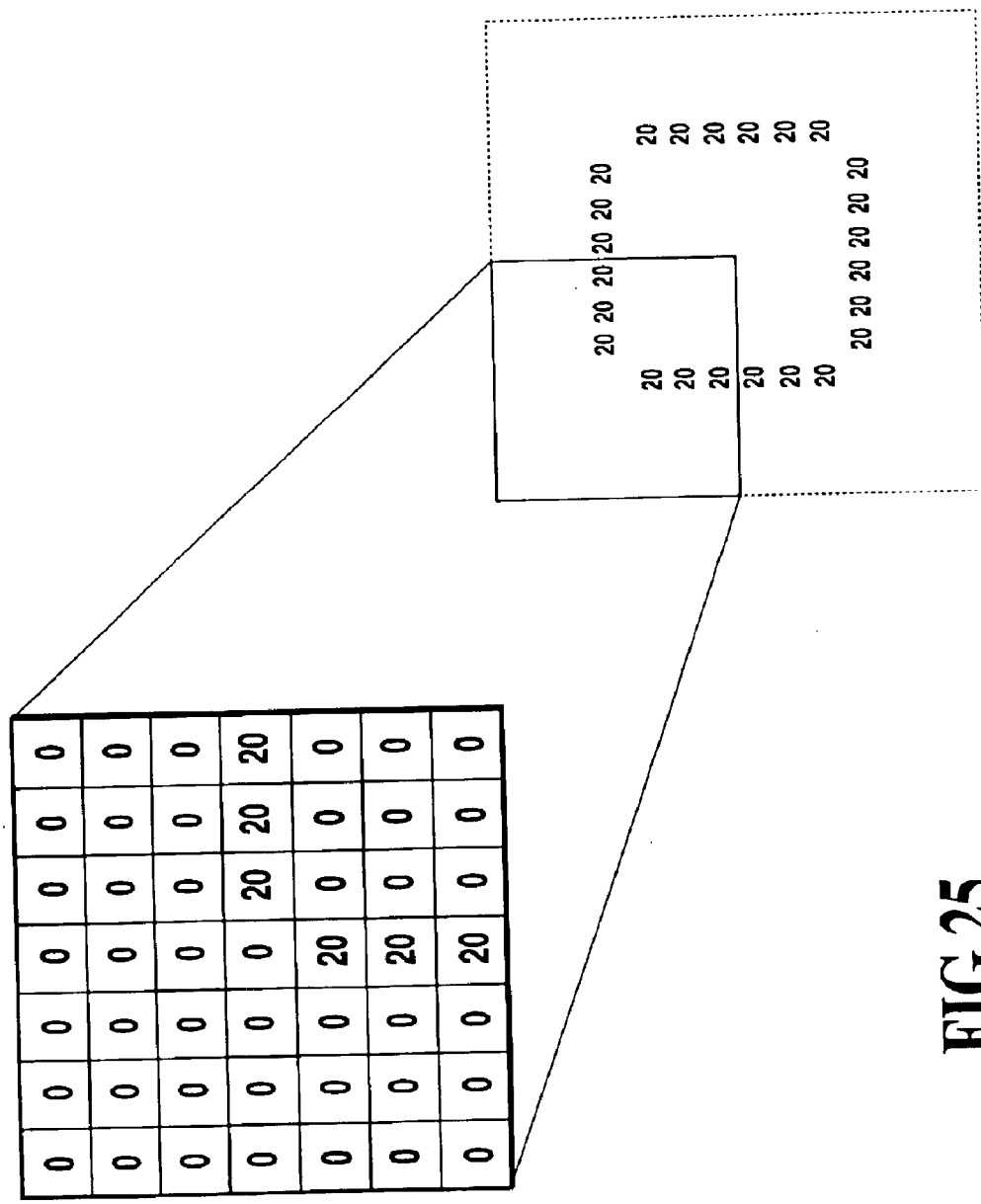
FIG. 25 is a diagram showing an example of the edge amplitudes of a two-dimensional pattern image to-be-inspected.
Figure 26:
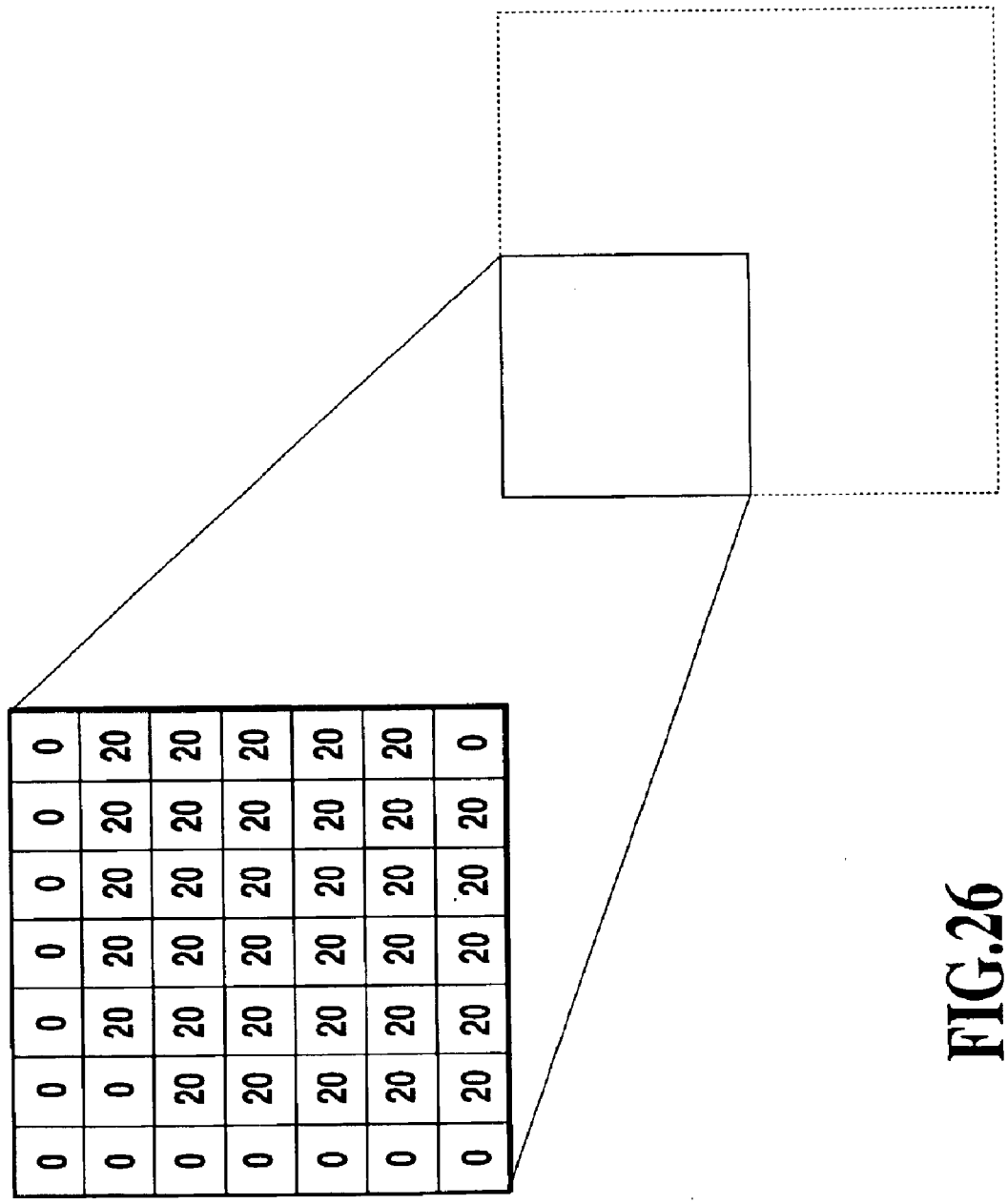
FIG. 26 is a diagram showing an example where the edges of FIG. 25 were dilated.
Figure 27:
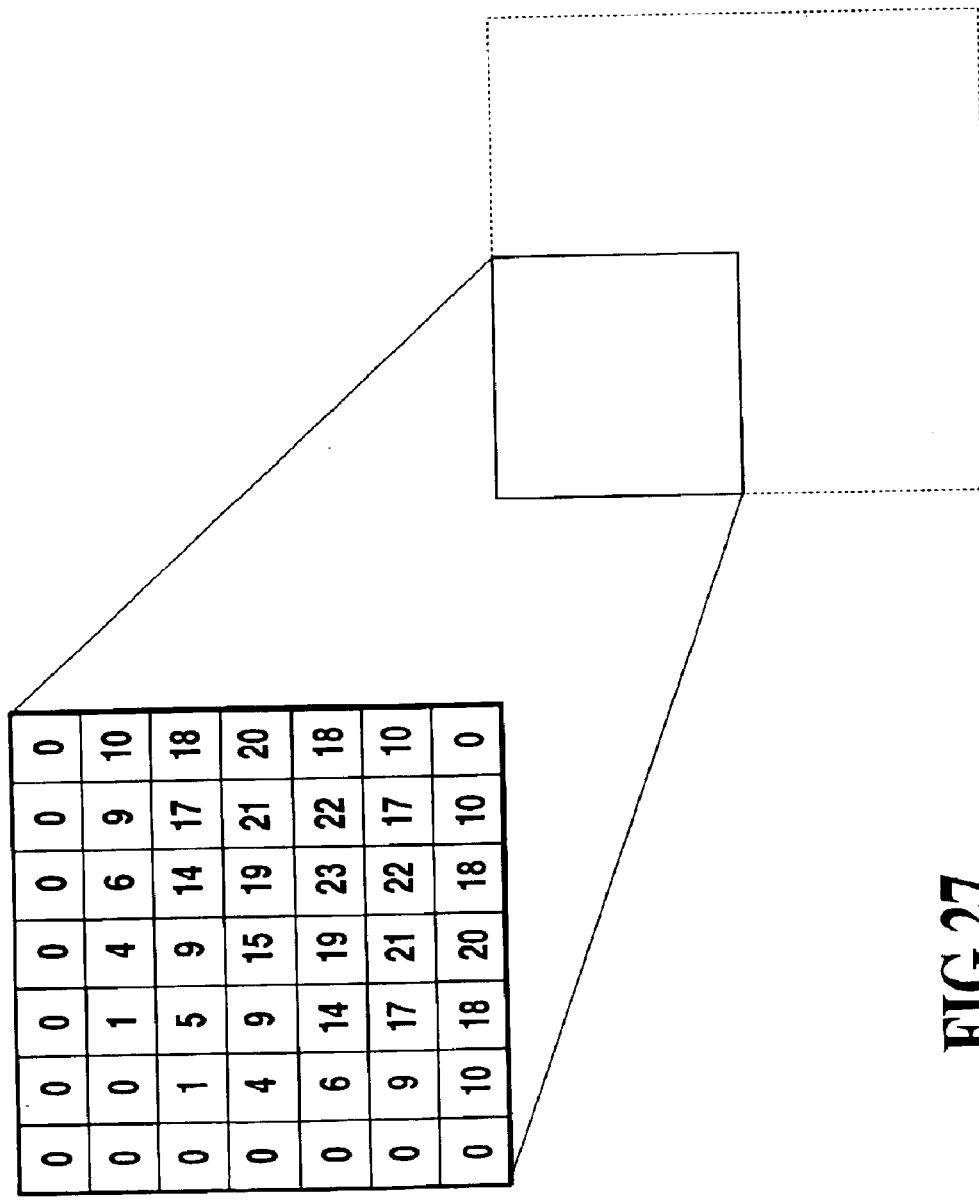
FIG. 27 is a diagram showing another example where the edges of FIG. 25 were dilated.

FIG. 25 is a diagram showing an example of the edge amplitudes of the two-dimensional pattern image to-be-inspected and FIG. 26 and FIG. 27 are diagrams each showing an example where the edges of FIG. 25 are dilated. In FIG. 25, the amplitude values are all zero except for pixels having an amplitude of 20. FIG. 26 shows a result for the case where the same dilation as of FIG. 19 is conducted and FIG. 27 shows a result for the case where the same dilation as of FIG. 23 is conducted.

Figure 28:
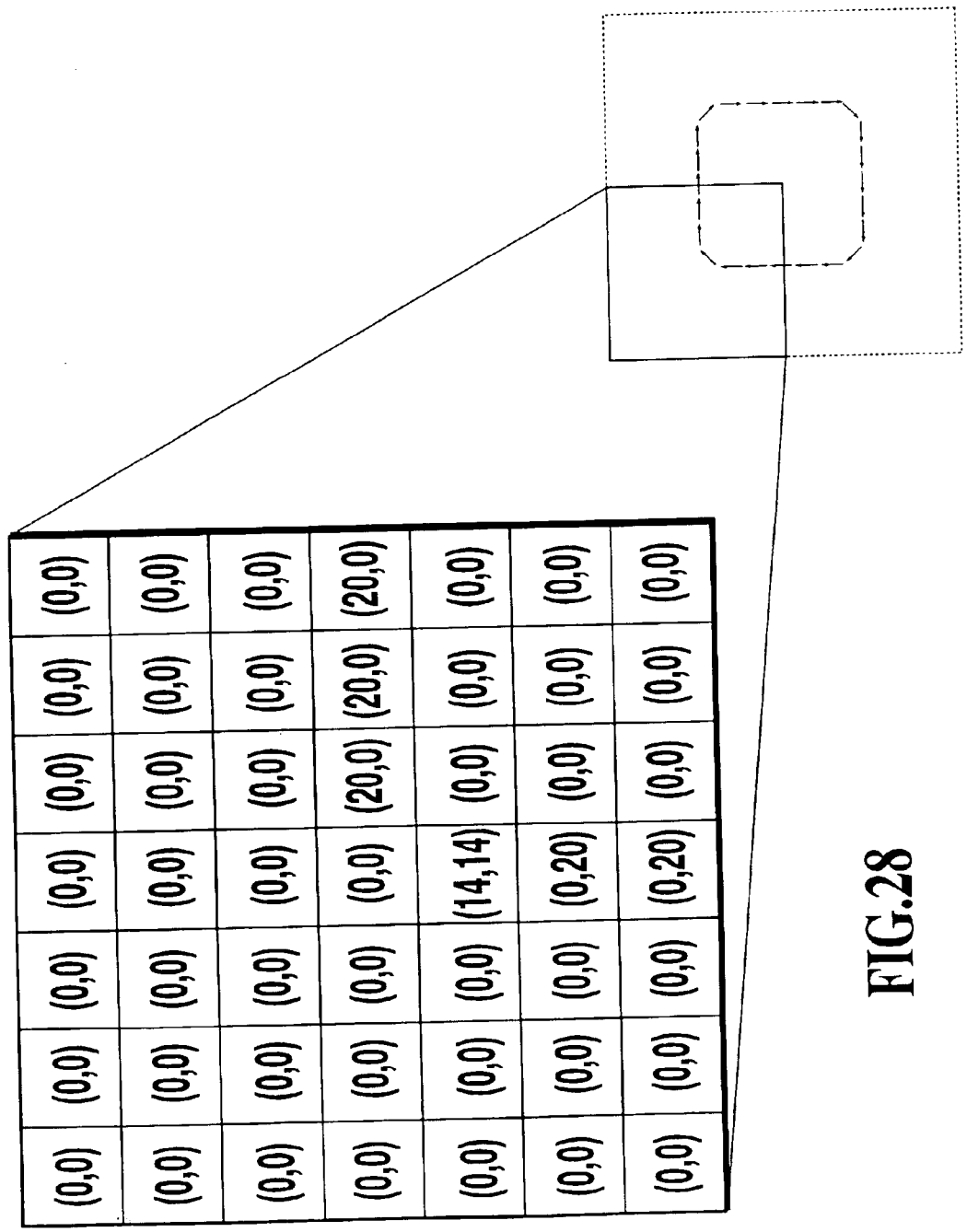
FIG. 28 is a diagram showing an example of the edge vectors of the two-dimensional pattern image to-be-inspected.
Figure 29:
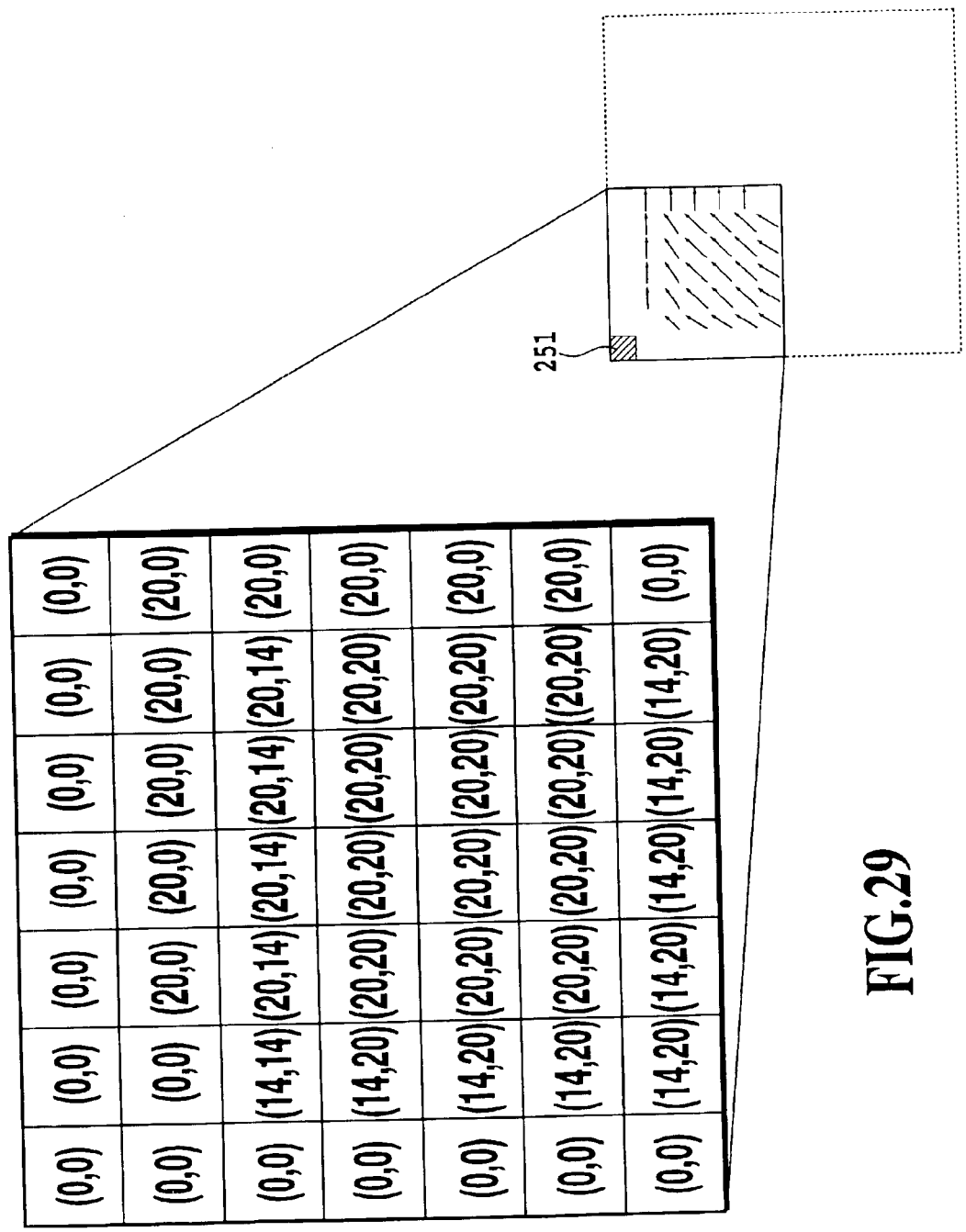
FIG. 29 is a diagram showing an example where the edge vectors of FIG. 28 were dilated.
Figure 30:
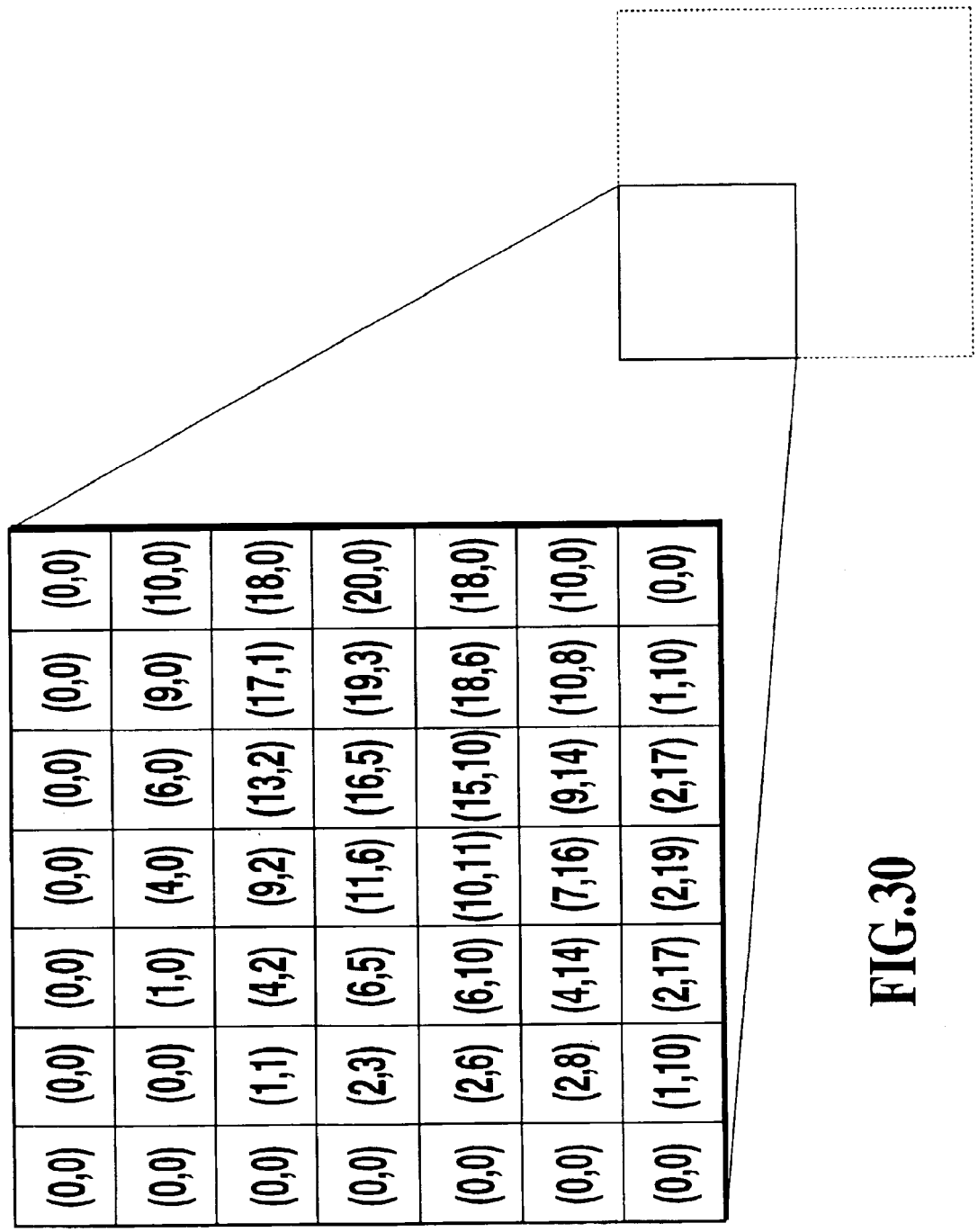
FIG. 30 is a diagram showing another example where the edge vectors of FIG. 28 were dilated.

FIG. 28 is a diagram showing an example of the edge vectors of the two-dimensional pattern image to-be-inspected and FIG. 29 and FIG. 30 are diagrams each showing an example where the edge vectors of FIG. 28 are dilated. FIG. 29 shows a result for the case where the same dilation as of FIG. 19 is conducted and FIG. 30 shows a result for the case where the same dilation as of FIG. 23 is conducted. The dilation is conducted for each x- and y-component separately.

The inspection part 12 compares the dilated edges (edges formed by dilating the edge of the pattern image to-be-inspected) with the edge of the reference pattern and performs the matching between the pattern image to-be-inspected and the reference pattern, pixel by pixel (step S314).

Figure 31:
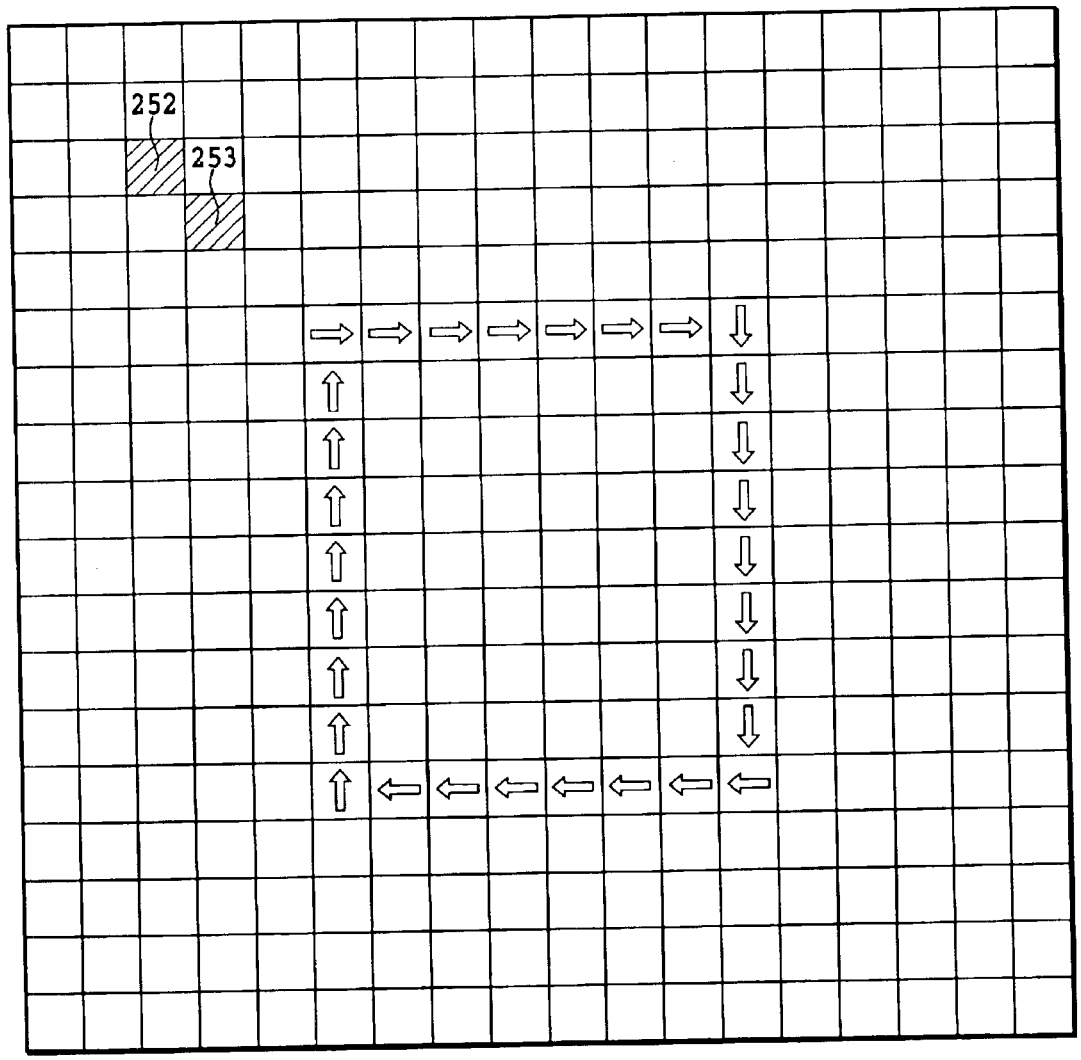
FIG. 31 is another diagram of FIG. 10 where the reference pattern thereof is expressed with the edge vectors for respective pixels.

Since in this embodiment, as will be described later, the matching is performed with a sub pixel accuracy, here the matching is conducted pixel by pixel with an intention of achieving speed-up thereof. FIG. 31 is for designating FIG. 11 in units of pixel.

Figure 32:
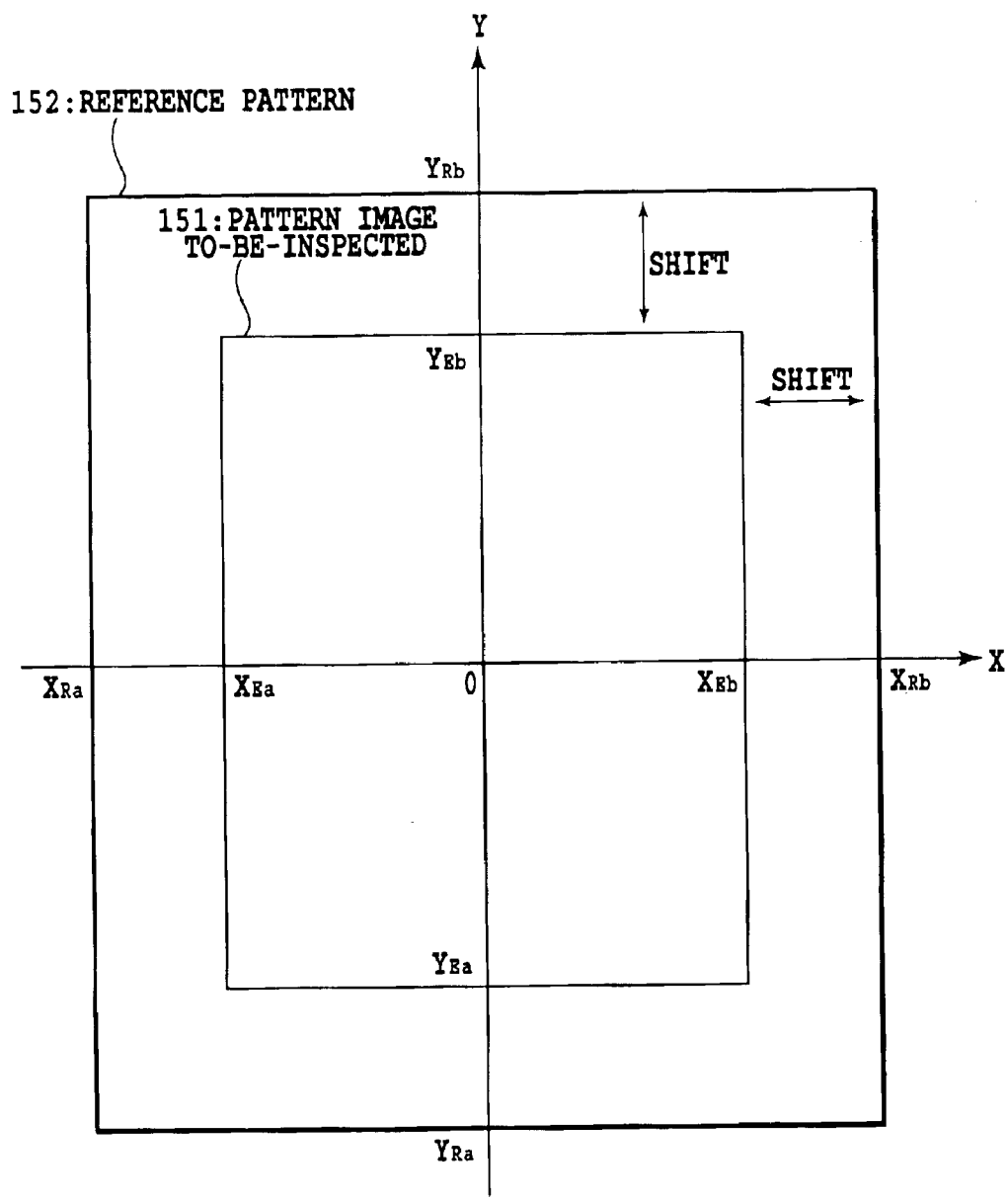
FIG. 32 is a diagram for explaining the matching.

In the matching of this embodiment, the reference pattern is shifted to the pattern image to-be-inspected vertically and horizontally in units of pixel to find a position where the evaluation value $F_0$ becomes the maximum, and that position is assumed to be a matching position (FIG. 32). In this embodiment, as in the following, a total sum of the amplitudes of the dilated edges in pixels where the edge of the reference pattern exists is taken as the evaluation value $F_0$.

$$F_0(xs, ys) = \sum_{x=X_{Ea}}^{X_{Eb}} \sum_{y=Y_{Ea}}^{Y_{Eb}} |E(x, y)||R(x + xs, y + ys)|$$

$(X_{Ra} - X_{Ea} \leq xs \leq X_{Rb} - X_{Eb})$ $(Y_{Ra} - Y_{Ea} \leq ys \leq Y_{Rb} - Y_{Eb})$ Here, E (x, y) is an edge vector whose magnitude is equal to the amplitude of the dilated edge and whose direction is identical to the direction of the dilated edge. In pixels where no edge exists, the magnitude of E(x, y) is zero. R (x+xs, y+ys) is an edge vector whose direction is identical to the edge direction of the reference pattern, where the magnitude of R (x+xs, y+ys) is unity in the pixels where the edge exists and zero in the pixels where no edge exists. Here, a vector (xs, ys) is the shift quantity $S_1$ of the edge of the reference pattern.

If, in the calculation of $F_0$, only the pixels whose R (x, y) is non-zero are stored, the calculation can be performed rapidly and the used memory area can be reduced. If the finishing of the high-speed calculation that is used in the sequential similarity detection algorithm (SSDA) is adopted with the use of the total sum of the pixel amplitude values as an evaluation function, the calculation can be speeded up even further.

Figure 33:
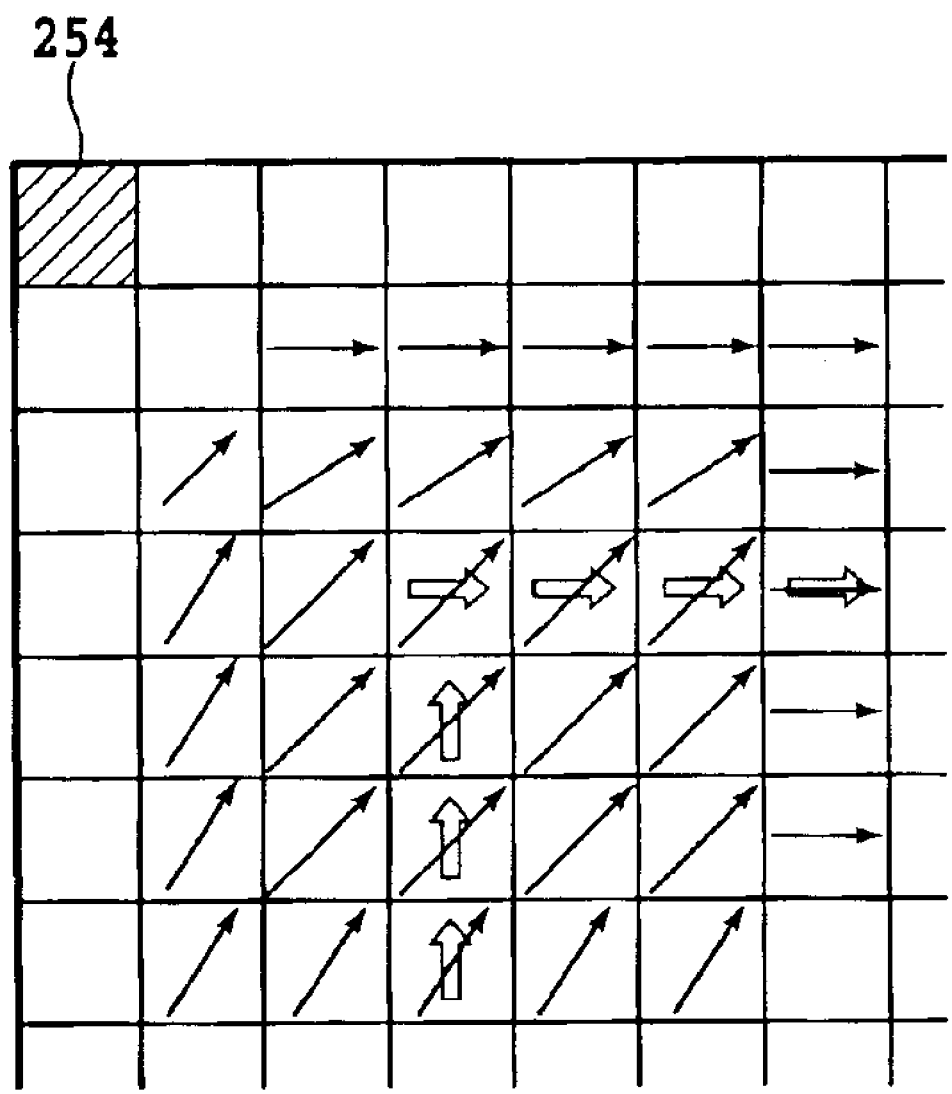
FIG. 33 and FIG. 34 are diagrams formed by superimposing FIG. 29 and FIG. 31.
Figure 34:
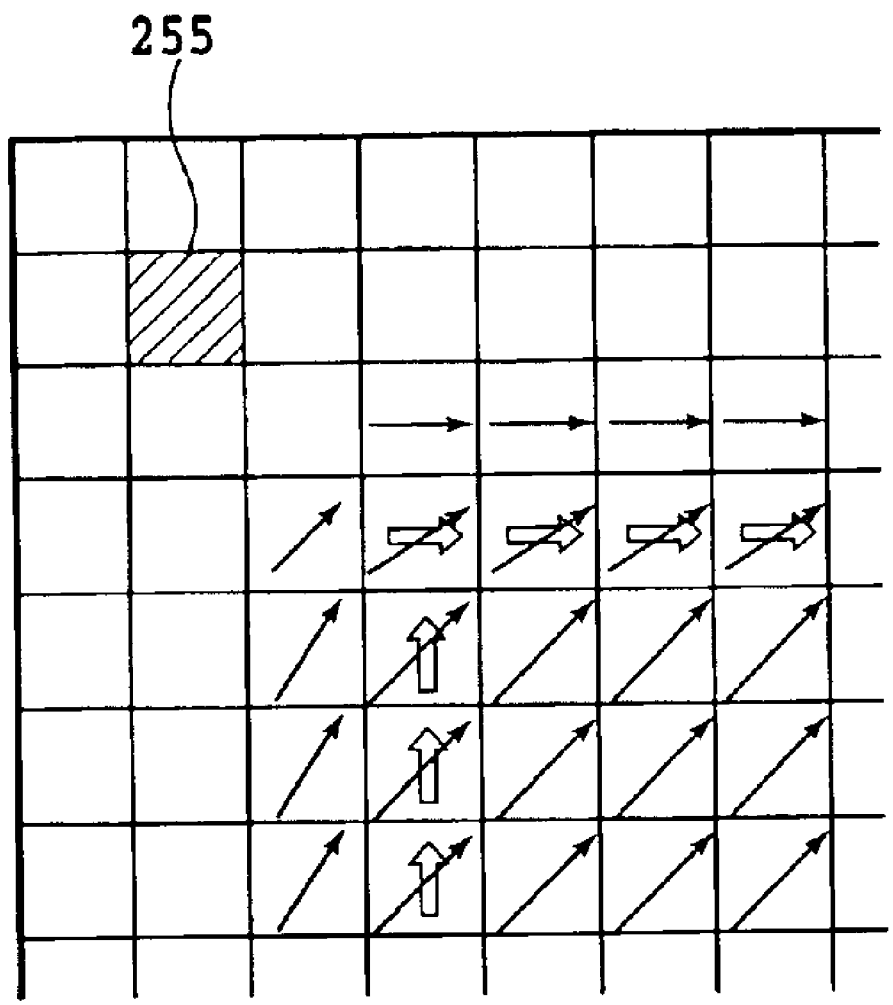

FIG. 33 and FIG. 34 are diagrams each of which is made by superimposing FIG. 29 and FIG. 31. In FIG. 33, a pixel 254 corresponds to a pixel 251 of FIG. 29 and also to a pixel 252 of FIG. 31. In FIG. 34, the superimposing is conducted with the pattern image to-be-inspected shifted rightward by one pixel and downward by one pixel from the state of FIG. 33. Therefore, a pixel 255 corresponds to the pixel 251 of FIG. 29 and also to the pixel 253 of FIG. 31. When the evaluation value $F_0$ is used, the larger the degree of overlapping of the pixels where the edge exists is, the higher the evaluation value becomes. In the case where the evaluation value $F_0$ is used, it is recommended that the dilation processing as shown in FIG. 25 through FIG. 27 should be conducted. In addition, the evaluation value $F_0$ can be applied to both images of (A) and (B).

In this embodiment, the aforesaid evaluation value $F_0$ is used, but other evaluation value can also be used. For example, in the case of the image having the contrast between the inside of the pattern and the grounding (case A), it may be conceivable that the following evaluation value $F_a$ is used.

$$F_a(xs, ys) = \sum_{x=X_{Ea}}^{X_{Eb}} \sum_{y=Y_{Ea}}^{Y_{Eb}} E(x, y) \cdot R(x + xs, y + ys)$$

$(X_{Ra}-X_{Ea} \leq xs \leq X_{Rb}-X_{Eb})$ $(Y_{Ra}-Y_{Ea} \leq ys \leq Y_{Rb}-Y_{Eb})$ Moreover, for example, in the case of (B) the image only whose edges are bright, it may be conceivable that the following evaluation value $F_b$ is used.

$$F_b(xs, ys) = \sum_{x=X_{Ea}}^{X_{Eb}} \sum_{y=Y_{Ea}}^{Y_{Eb}} |E(x, y) \cdot R(x + xs, y + ys)|$$

$(X_{Ra}-X_{Ea} \leq xs \leq X_{Rb}-X_{Eb})$ $(Y_{Ra}-Y_{Ea} \leq ys \leq Y_{Rb}-Y_{Eb})$ In the case where the evaluation value $F_a$ or $F_b$ is used, it is recommended that the dilation processing as shown in FIG. 28 through FIG. 30 should be conducted. However, when the dilation as shown in FIG. 29 is conducted, the dilation is done for both the maximum value of the positive values and the maximum value of the negative values and one that gives a larger total sum in calculating the inner products is selected.

Figure 35A:
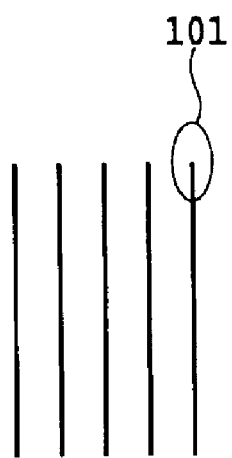
FIG. 35A is a diagram showing an example of the reference pattern.
Figure 35B:
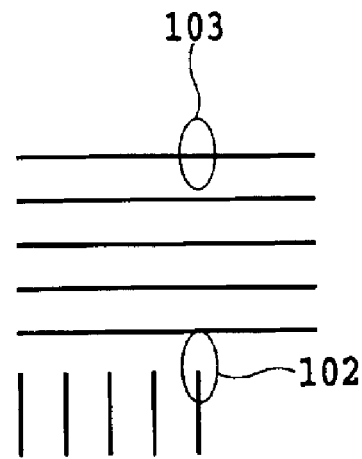
FIG. 35B is a diagram showing an example of the pattern image to-be-inspected.

Comparing the evaluation value $F_0$ and the evaluation values $F_a$, $F_b$ the evaluation value $F_0$ is suited for the high-speed processing because the data is scalar. On the other hand, the evaluation values $F_a$ and $F_b$ are effective, for example, in the case as shown in FIG. 35A and FIG. 35B. That is, when the evaluation values $F_a$ and $F_b$ are used, since the inner product between the edge vector of vertical line part of the reference pattern (FIG. 35A) and the edge vector of the horizontal line part of the pattern image to-be-inspected (FIG. 35B) becomes close to zero, a part 101 and a part 102 can be matched successfully. On the contrary, when the evaluation value $F_0$ is used, since only the amplitude is used to make the judgment regardless of the direction, the part 101 and a part 103 are likely to be matched erroneously.

Figure 36:
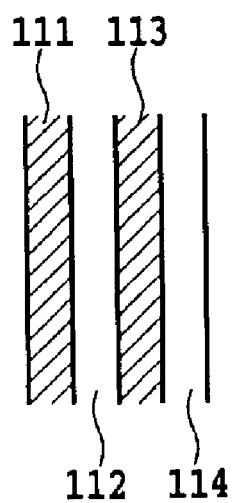
FIG. 36 is a diagram showing an example where the spacing of the wiring is identical to that of the grounding.

Next, comparing the evaluation values $F_a$ and $F_b$, for example, when the value $F_a$ is used in the case where the spacing between wiring 111, 113 and the spacing the grounding 112,114 are identical as shown in FIG. 36, the value $F_a$ can get a more preferable result than the value $F_b$, giving discrimination between the wiring and the grounding.

In this embodiment, the edges of the pattern image to-be-inspected are dilated and the matching is conducted. Alternatively, the edges of the reference pattern may be dilated to conduct the matching.

Moreover, the matching may be conducted in such a way that the weighting is altered depending upon the edge position of the reference pattern. This is carried out by the following procedure.

Figure 37A:
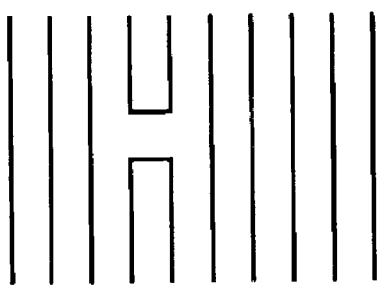
FIG. 37A is a diagram showing an example of the reference pattern.
Figure 37B:
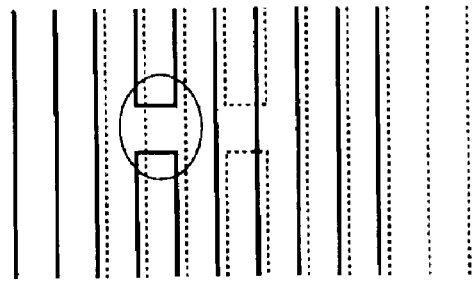
FIG. 37B is a diagram showing an example of the relation between the reference pattern of FIG. 37A and the pattern image to-be-inspected.

FIG. 37A is a diagram showing an example of the reference pattern, and FIG. 37B is a diagram showing an example of the reference pattern (solid lines) and the pattern image to-be-inspected (dotted lines). The reference pattern shown in FIG. 37A is a periodic pattern, which has an interstice at one position. When the matching between such a reference pattern and the pattern image to-be-inspected is conducted, even if both the patterns are different as shown in FIG. 37B, a large portion thereof except the interstice part coincides with each other and hence this matching gives a high evaluation value erroneously. To avoid this, it may be conceivable that a large weighting is given to this interstice part, so that the matching evaluation value will decrease largely when the interstice of the pattern image to-be-inspected and the interstice of the reference pattern don't coincide with each other.

Explaining the procedure of setting the weightings, first, the period of the pattern is obtained by the autocorrelation method. Next, by comparing the original pattern and that pattern shifted by one period, a feature that exists in a certain part of the original pattern but doesn't exist in the pattern shifted by one period is obtained. Then the pattern so obtained is recognized as a unique pattern and a contribution (weighting) thereof to the matching is set to be larger than that of other patterns. To express the degree of contribution, an empirical value (unity or more) is used for the amplitude of the reference pattern. For this value, a constant value, a value defined as a constant value divided by a ratio of the unique pattern to all the patterns and the like are effective.

When the matching was conducted and the shift quantity $S_1$=(xs, ys) at which the evaluation value took the maximum was obtained, the reference pattern is shifted by the amount of $S_1$. The processing thereafter is conducted while this shift is being maintained.

The shift quantity $S_1$ can be outputted into the display device 5 and the printer 6 as the inspection result.

After the matching is completed, the pattern image to-be-inspected is binarized. The binarization is done by judging whether each edge amplitude is present or absent with the use of one of the edge detection parameters in the recipe (threshold value). Alternatively, there is also a method (p tile method) where the edge image of the pattern image to-be-inspected is binarized so that the number of pixels each corresponding to the edge of the reference pattern×p (p: normally 0.9 to 1.1) becomes unity. It is recommended that the above-described threshold value or the value p should be set as the parameter of (R3).

(The First Inspection)

Next, the inspection part 12 performs the first inspection. Concretely, calculation of the pattern deformation quantity and the defect detection are conducted.

The inspection part 12 assumes the correspondence between the edge of the pattern image to-be-inspected and the edge of the reference pattern (step S318).

The edge position is treated with a sub pixel accuracy. Therefore, the distance between the two edges can also be obtained with a sub pixel accuracy. The direction is determined as a value in a range of 0 to 360 degrees with the right direction being set to, for example, 0 degree.

For each edge pixel of the reference pattern, the edge pixels of the pattern image to-be-inspected located within the distance of the allowable pattern deformation quantity equal to (R2) are searched. Then, among the detected edges, one edge whose directional difference from the edge of the reference pattern falls within (R2) "a limit of the allowable directional difference of the edge" is determined as the corresponding edge within the allowable deformation. That is, in this embodiment, the correspondence-assumption is conducted considering the distance between the edge of the pattern image to-be-inspected and the edge of the reference pattern that have undergone the matching and the directions of both edges. A vector d (x, y) between the two edges that have been assumed to be in the correspondence to each other can be used to obtain the pattern deformation quantity.

In addition, if there exist a plurality of candidates for the correspondence-assumption, a candidate whose distance is small and whose directional difference is small is prioritized for the correspondence-assumption.

Figure 38:
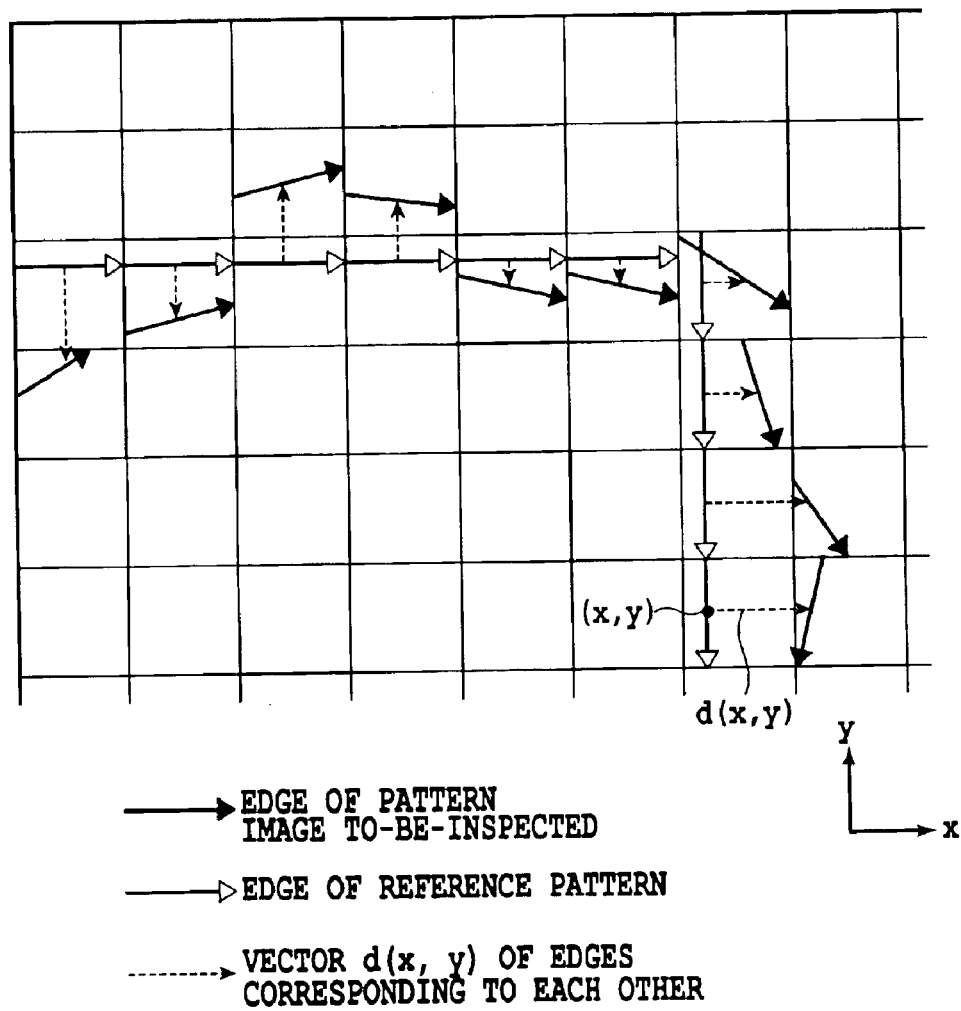
FIG. 38 is a diagram showing an example of the edges of the pattern image to-be-inspected after the matching was conducted and the edges of the reference pattern.

FIG. 38 is a diagram showing an example of the correspondence-assumption between the edge of the pattern image to-be-inspected and the edge of the reference pattern. In FIG. 38, each edge is indicated by an arrow to show its direction. In the example of FIG. 38, the correspondence-assumption is conducted for each pixel that contains the edge of the reference pattern by finding the edge of the pattern image to-be-inspected in a direction perpendicular to the edge direction from the center of the edge of the reference pattern. If an edge of the pattern image to-be-inspected such that the distance thereof is within the allowable pattern deformation quantity and that the directional difference is within the allowable directional difference of the edge is found, the correspondence between both the edges are assumed. In FIG. 38, the vector d(x, y) between the two edges that have been assumed to be in the correspondence to each other is shown for reference.

Figure 39A:
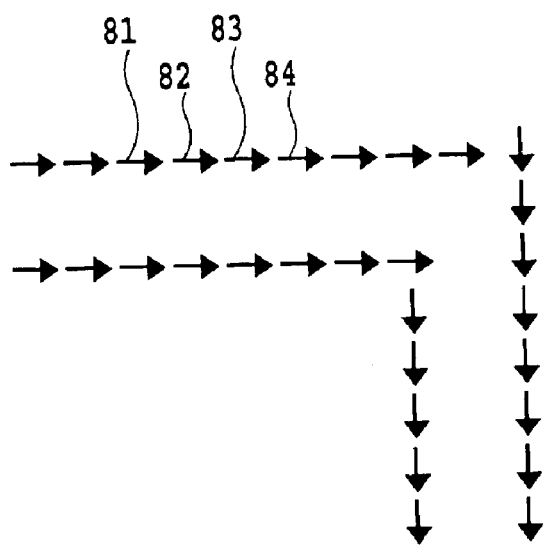
FIG. 39A is a diagram showing an example of the edges of the reference pattern.
Figure 39B:
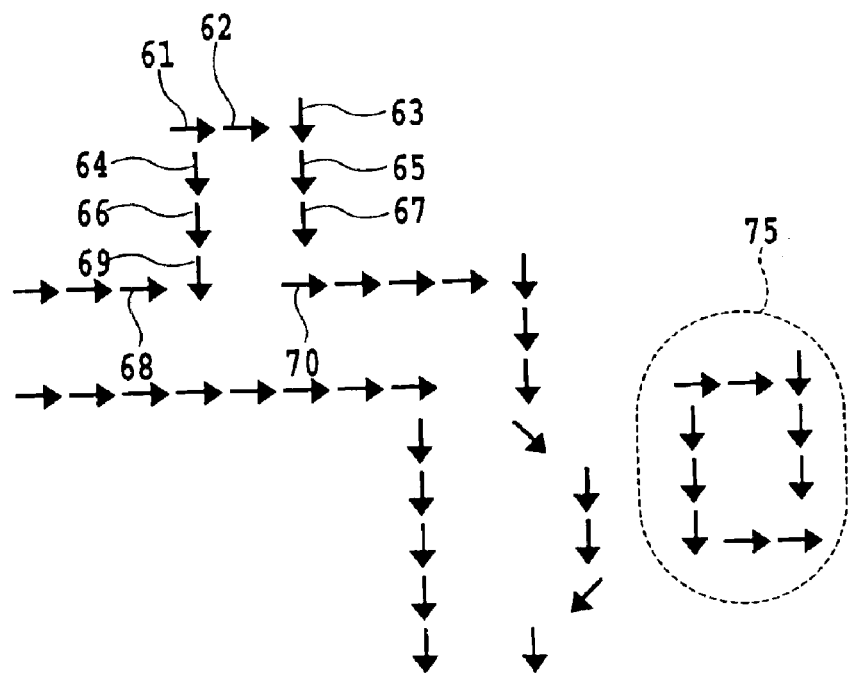
FIG. 39B is a diagram showing an example of the edges of the pattern image to-be-inspected.

FIG. 39A is a diagram showing an example of the edge of the reference pattern, and FIG. 39B is a diagram showing an example of the edge of the pattern image to-be-inspected corresponding to the reference pattern of FIG. 39A. Referring to FIG. 39A and FIG. 39B, the correspondence-assumption of both the edges will be described. In this example, the allowable pattern deformation quantity is set to one pixel, and the allowable directional difference of the edge is set to 60 degrees. For example, consider the case where an edge of the pattern image to-be-inspected corresponding to an edge 81 of the reference pattern is being searched. Since an edge 68 is within the distance of the allowable pattern deformation quantity from the edge 81 and its directional difference is not more than the allowable directional difference of the edge, the edge 68 is determined as the corresponding edge to the edge 81. Also regarding an edge 84 of the reference pattern, an edge 70 is determined as the corresponding edge of the pattern image to-be-inspected. At this occasion, regarding an edge 82 of the reference pattern, an edge 61 is not within the distance of the allowable pattern deformation quantity. An edge 64 is not within the distance of the allowable pattern deformation quantity and the directional difference is larger than the allowable directional difference of the edge. Although edges 66 and 69 are within the distance of the allowable pattern deformation quantity, their directional differences are larger than the allowable directional difference of the edge. Therefore, an edge corresponding to the edge 82 cannot be found. Similarly, an edge corresponding to an edge 83 cannot be found.

Figure 40:
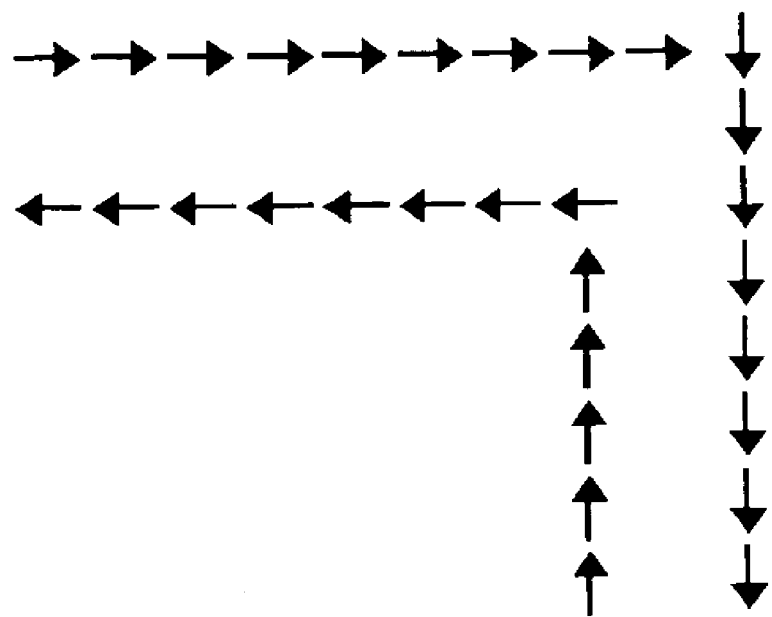
FIG. 40 is a diagram showing another example of a technique for giving direction information.

In addition, FIG. 39A and FIG. 39B exemplify a method whereby the inside and the outside of the pattern are not differentiated and where the direction is specified to have a value only in a range of 0 to 180 degrees. However, a method whereby the inside and the outside of the pattern are differentiated can be used. For example, if the edge direction is determined so that the inside of the pattern is always to the right of the edge, the pattern image of FIG. 39A becomes as of FIG. 40, and hence the correspondence-assumption can be executed more exactly.

Next, the inspection part 12 conducts the defect detection (step S320). When the defect is detected, defect information (here, information of the defect position and the size and its image) is outputted into the defect-class determination part 14 (steps S322, S324).

The defect-class determination part 14 judges the defect class based on the defect information and information of the defect-class reference database 23 (step S326). That is, the feature quantities are obtained from the given image and is collated with the feature quantities of the images stored in the defect-class reference image database to achieve the judgment of the defect class. The defect-class determination part 14 outputs the defect information and the defect class into the display device 5 and the printer 6 through the output part 13 (step S328). Here, the defect-class reference database 23 is a database where already acquired images have been registered for respective defect classes.

For a method to determine the defective area, there is a conceivable method for determining the defective area (determination method A) where an area is determined from the edges of the pattern image to-be-inspected that the inspection part failed to assume the correspondence to the edges of the reference pattern and this area is determined as the defective area. This method is effective in detecting the defect having distinct edges. However, since this method is weak in detecting the defect having indistinct edges, for such a case, a better suited method (determination method B) is where an area is determined from the edges of the pattern image to-be-inspected that have been assumed to be in the correspondence to the edges of the reference pattern and a part of that area whose distribution of the pixel luminance value is non-uniform is determined as the defective area. That is, the defect is determined from abnormality of the luminance value distribution.

In the determination method A, the pixels containing the edges of the pattern image to-be-inspected that the inspection part failed to assume the correspondence to the edges of the reference pattern (for example, edges 61 to 67 and edges 69 to 75 of FIG. 39A) are determined as the defect. The inspection part 12 dilates these pixels to effect joining of the pixels. For processing to dilate a bit map (binarized image) like this, processing called morphology is known. Next, the pixels that were joined to form one block area are determined as one clustered area through the labeling processing. Here, the labeling processing means a method whereby a group of the joined pixels is formed by writing the same value on the pixels that are being joined at four neighborhoods or eight neighborhoods thereof. By giving a different value to the pixels that are not joined, the group of the joined pixels can be distinguished from the other pixels. When the pixels have been isolated as this clustered area, this area is judged as an alien substance and its shape is determined. The inside pixels surrounded by the shape are filled by the paint processing. These pixels are regarded as the defects and the centroid and size of the defects are calculated.

In the determination method B, the edges of the pattern image to-be-inspected that have been assumed to be in the correspondence to the edges of the reference pattern are joined to form an area. In its inside area and in its outside area, respectively, a part excluding the boundary (edge) is obtained as the clustered pixels. For the inside area of the clustered pixels and for the outside area thereof, the pixel luminance values are obtained from the pattern image to-be-inspected that were initially obtained. If there is no defect, these values can be expected to constitute a normal distribution. That is, by applying a quality control method, defect pixels can be detected. If these pixels are normal, the variation in the luminance is expected to be small both in the inside area and in the outside area. Therefore, an area whose luminance distribution is non-uniform among the aforesaid areas in the pattern image to-be-inspected can be detected and the said area can be determined as the defective area. The defect pixels so obtained are determined as the clustered pixels and the centroid and size thereof are calculated.

Figure 41:
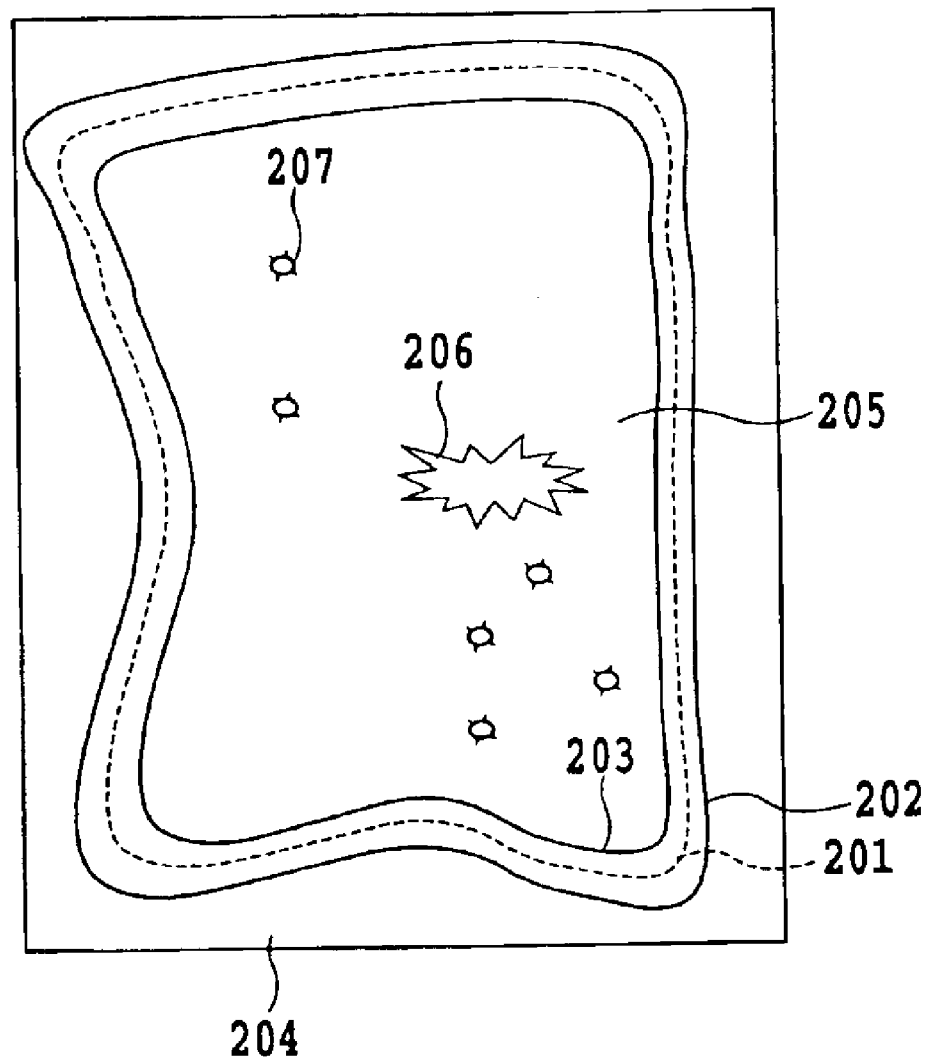
FIG. 41 is a diagram showing an example of the pattern image to-be-inspected.

FIG. 41 is a diagram showing an example of the pattern image to-be-inspected. A broken line 201 shows the edge of the pattern image to-be-inspected. Solid lines 202, 203 on both sides of the broken line 201 are segment lines which are formed by dilating the edges by a predetermined width, and a part surrounded by the solid lines 202, 203 is determined as the edge area. The luminance values of a grounding 204 and an inside 205 of the pattern roughly constitute a normal distribution.

Figure 42:
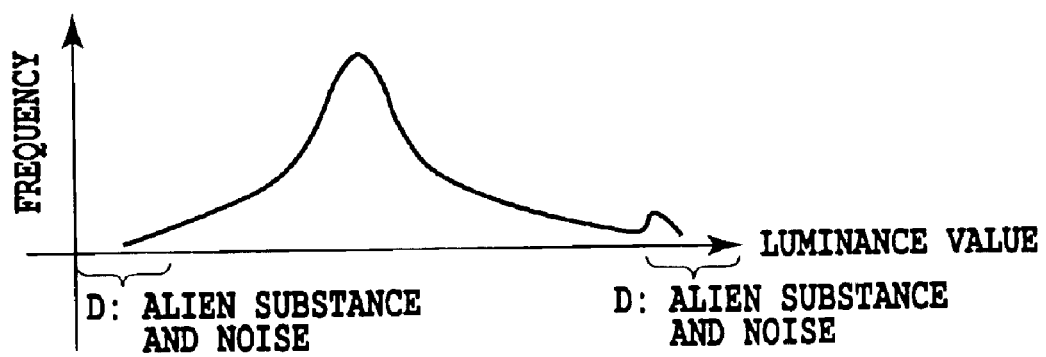
FIG. 42 is a diagram showing an example of the frequency distribution of the luminance value

As shown in FIG. 42, a part D located beyond the ±3 σ regions of the distribution is very likely to be the alien substance. Although the part D also contains a noise, the noise exists in the area in a relatively uniform manner, whereas the alien substance exists as being clustered. A binarized map in which any pixel having a luminance value equal to that of D is binarized to unity and a pixel having other luminance value is binarized to zero is formed. The clustered pixels each having a luminance of unity whose size is not more than a specified size (for example, 2×2 pixels) is erased (for example, the clustered pixels 207 of FIG. 41 being erased). A median filter and a morphology filter can be used. A window size of these filters should be an empirical value that is determined considering the size of the alien substance which the operator wishes to detect. The clustered pixels each having a luminance of unity (for example, the clustered pixels 206 in FIG. 41) are regarded as the alien substance.

The defect-class determination part 14 can perform automatic classification of the defect classes as follows. That is, the geometrical feature quantities of the clustered pixels that were determined as defects are obtained. Based on these, a shape feature such as being circular, being elongated, etc. can be grasped, and if the shape is circular, the defect is judged to be the alien substance, if being elongated, the defect is judged to be a scratch, and the like. The pixels that were judged to be defects are classified into three classifications: pixel inside the pattern; pixel outside the pattern; and pixel on the boundary. For each classification, the features quantities of the pixels are obtained by using the pixel luminance values of the pattern image to-be-inspected, which were initially obtained. If the pixel is judged to be the alien substance based on the feature quantities obtained at this stage (for example, the geometrical feature quantities), there can be judged whether the alien substance is a metal piece or organic material (for example, human scale) or the like. That is, the defect class can be judged from a fact: if the alien substance is a metal, it looks bright because of its strong reflection; and if it is the organic material, it looks dark. Further, in the case where the alien substance exists inside the pattern, when the pixels judged to be the alien substance show large variation in the luminance, it is judged that the alien substance concerned is very likely to exist on the pattern; when such pixels show small variation in the luminance, it is judged that the alien substance concerned is very likely to exist beneath the pattern. This is difficult processing for the conventional die-to-die method to achieve. The present method uses these feature quantities to judge the defect class by a well-known classification method. For the classification method, a technique whereby the defect class is judged by comparing the defect with the defect-class reference image database using a k nearest neighbor method is effective.

Such defect-class automatic classification is a method based on a conventionally applied optical method, namely, the ADC (Automatic Defect Classification) of the SEM method. According to the method of the present invention that uses the design data, discrimination between the inside and the outside of the pattern can be conducted clearly; therefore the feature quantities for each part are grasped correctly and accuracy of the classification is improved.

Next, the inspection part 12 obtains the pattern deformation quantity from the relation of the edge of the pattern image to-be-inspected and the edge of the reference pattern that have been assumed to be in the correspondence to each other (step S330). The pattern deformation quantity is obtained for a part where a defect was not detected as a result of the defect detection. Then the pattern deformation quantity is outputted into the display device 5 and the printer 6 through the output part 13 (step S332).

Two pattern deformation quantities can be considered: the pattern deformation quantity obtained from the whole image; and the pattern deformation quantity obtained for each attribute of the pattern.

As the pattern deformation quantity obtained from the whole image, for example, a displacement quantity, a magnification variation quantity, and a dilation quantity of the line width can be considered.

The displacement quantity can be calculated as an average value of the vectors d(x, y) between the two edges that have been assumed to be in the correspondence to each other. This value becomes the shift quantity (correction quantity) $S_2$ at a sub pixel accuracy of $S_1$=(xs, ys). By further shifting by this shift quantity (correction quantity) $S_2$ the reference pattern having been shifted through the matching by pixel increments (or decrements), the matching can be achieved with a sub pixel accuracy.

In order to calculate the magnification variation quantity in the x-direction, the x-components of the vectors d(x, y)

concerning the reference pattern in a longitudinal direction are approximated with a line to find the regression line $D(x)$. Then the gradient of the regression line is assumed to be the magnification variation quantity in the x-direction. The procedure is the same for the magnification variation quantity in the y-direction.

Figure 43A:
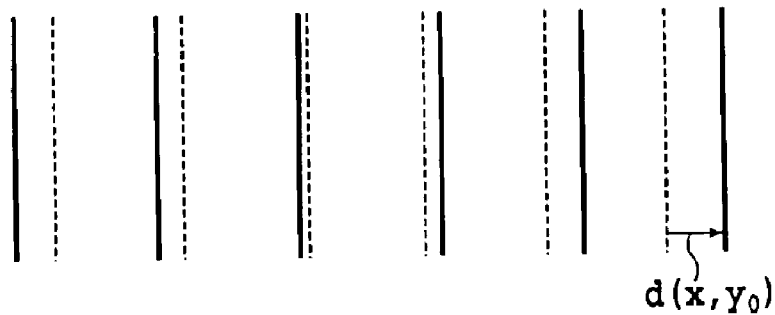
FIG. 43A is a diagram showing an example of the edges of the reference pattern and the edges of the pattern image to-be-inspected.
Figure 43B:
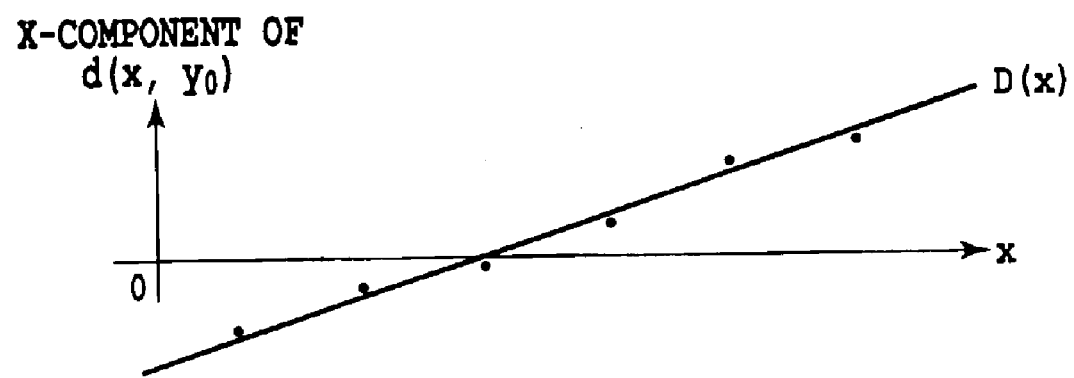
FIG. 43B is a diagram showing an example where x-components of the vectors $d(x, y_0)$ at $y=y_0$ between the two edges shown in FIG. 43A are approximated with a regression line $D(x)$.

FIG. 43A is a diagram showing an example of the edges of the reference pattern (broken lines) and the edges of the pattern image to-be-inspected (solid lines), and FIG. 43B is a diagram showing an example where the x-components of the vectors $d(x, y_0)$ between the two edges at $y=y_0$ shown in FIG. 43A are approximated with the regression line $D(x)$. When the x-components of the vectors $d(x, y_0)$ are approximated with the regression line $D(x)=ax+b$, the gradient a corresponds to the magnification variation quantity. In the example of FIG. 43A, it turned out that the pattern of the pattern image to-be-inspected is larger than the reference pattern as a whole.

Figure 44A:
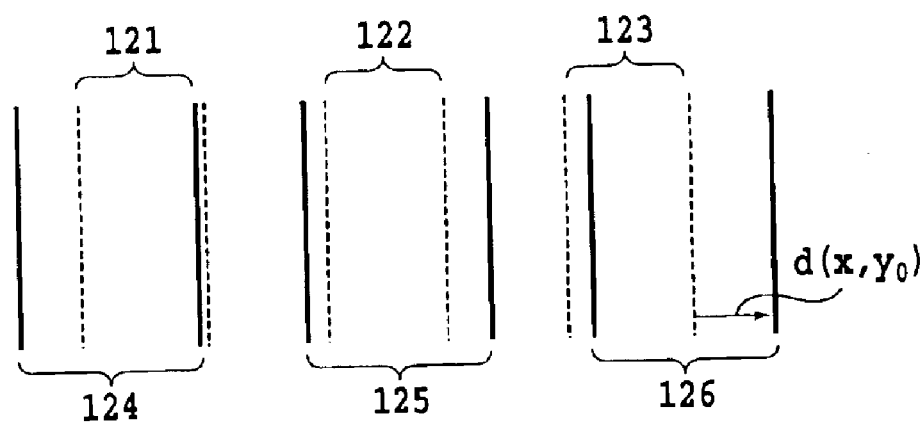
FIG. 44A is a diagram showing another example of the edges of the reference pattern and the edges of the pattern image to-be-inspected.
Figure 44B:
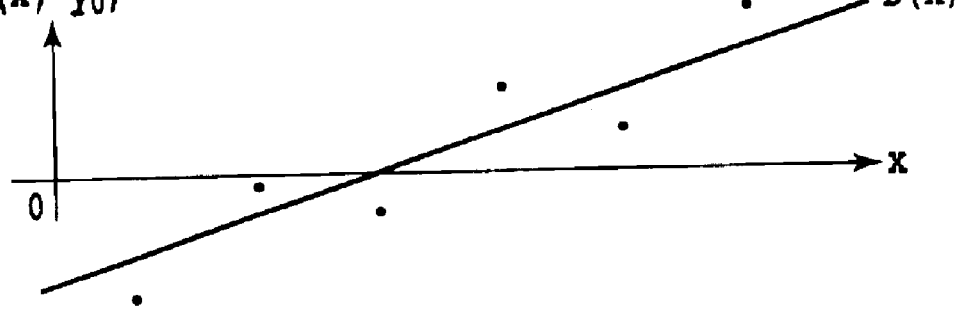
FIG. 44B is a diagram showing an example where x-components of the vectors $d(x, y_0)$ at $y=y_0$ between the two edges shown in FIG. 44A are approximated with the regression line $D(x)$.

FIG. 44A is a diagram showing another example of the edges of the reference pattern (broken lines) and the edges of the pattern image to-be-inspected (solid lines), and FIG. 44B is a diagram showing an example where the x-components of the vectors $d(x, y_0)$ between the two edges at $y=y_0$ shown in FIG. 44A are approximated with the regression line $D(x)$. In the example of FIG. 44A, in addition to a fact that the pattern of the pattern image to-be-inspected is larger than the reference pattern as a whole, the line width is dilated. In FIG. 44A, the lines (wiring) 121, 122, and 123 of the reference pattern correspond to the lines 124, 125, and 126 of the pattern image to-be-inspected, respectively.

The dilation quantity of the line width in the x-direction can be obtained, for example, by calculating the average value of sign$(x, y_0) \times \{$x-component of $d(x, y_0)-D(x)\}$. Here, sign $(x, y_0)$ takes a value of $-1$ when the position of $(x, y_0)$ is at the left end of the line; it takes a value of $+1$ when the position is at the right end of the line. In addition, if the variance of sign$(x, y_0) \times \{$x-component of $d(x, y_0)-D(x)\}$ is calculated regarding the dilation quantity of the line width, a degree for the variation in the line width can be obtained.

Figure 45:
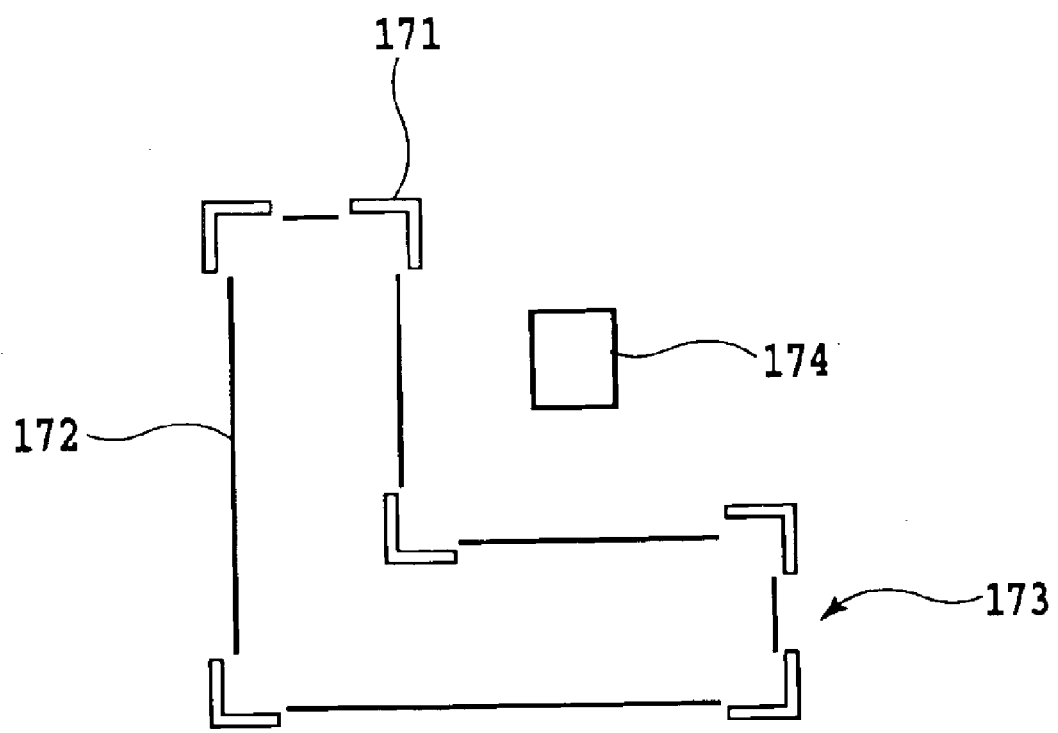
FIG. 45 is a diagram showing an example of the attributes of the pattern.

Next, the pattern deformation quantity that can be obtained for each of pattern attributes will be described. As pattern attributes, a corner 171, a long wiring 172, a top end 173, an isolated pattern 174, etc. can be considered (FIG. 45). As the pattern deformation quantities concerning the pattern attributes, for example, the followings can be considered: the displacement quantity for each of the aforesaid attributes, the magnification variation quantity; and the dilation quantity of the line width; in addition, the deformation quantities of the feature quantities such as the area, the length of periphery, the circularity, the moment, and the radius of curvature.

The attribute information of the pattern can be automatically added to the reference pattern. However, the addition of the attribute information can be also done manually. A rule for adding (extracting) the attribute information of the pattern is set as (R4) when the recipe is formed.

Figure 46A:
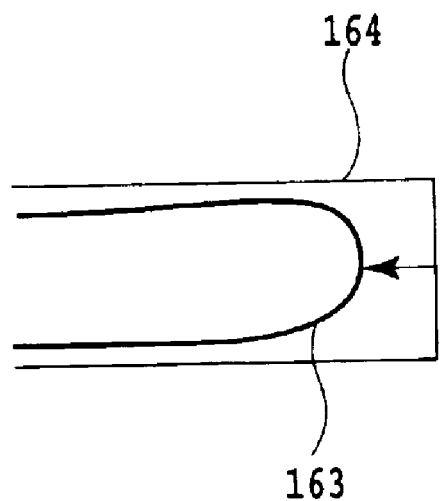
FIG. 46A and FIG. 46B are diagrams each showing the displacement quantity of the top end.

FIG. 46A is a diagram showing the displacement quantity of the top end. The displacement quantity of the top end is, as shown in FIG. 46A, the distance from an edge 164 of the reference pattern to an edge 163 of the pattern image to-be-inspected (in a perpendicular direction with respect to the edge of the reference pattern). As the displacement quantity of the top end, for example, the distance between the closest point to the edge 164 of the reference pattern in the edge 163 of the pattern image to-be-inspected and the edge of the reference pattern can be measured.

Figure 46B:
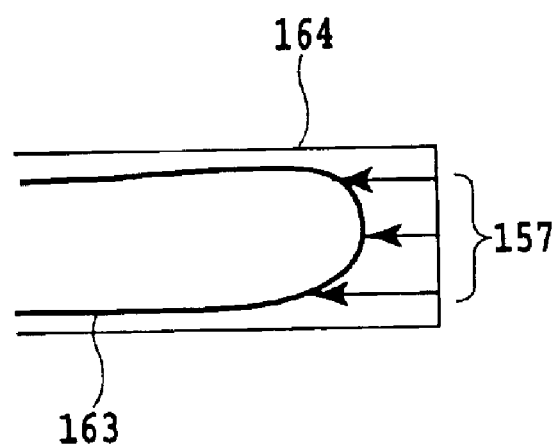

Alternatively, as shown in FIG. 46B, any of the average value, the maximum value, the minimum value, the median value, and the standard deviation of the distances that are measured for a plurality of times regarding a section 157 having an arbitrary width may be used for the displacement quantity of the top end.

In FIG. 46A and FIG. 46B, the displacement quantity of the top end is explained. However, also regarding the long wiring, the corner, the connection part between the attributes, the displacement quantity can be measured similarly. Moreover, for example, as for the corner, the displacement quantity in a direction at an angle of one half of the corner's angle or a specified angle can be measured.

Figure 47:
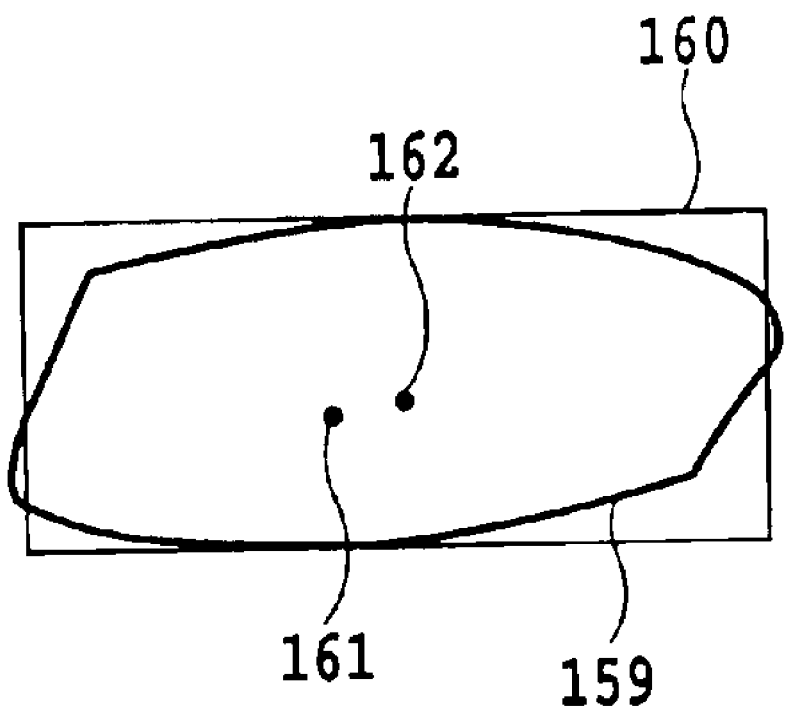
FIG. 47 is a diagram showing the displacement quantity of the centroid of the isolated pattern.

FIG. 47 is a diagram showing the displacement quantity of the centroid of the isolated pattern. The displacement quantity of the centroid is defined as the displacement quantity between a centroid 162 of an edge 160 of the reference pattern (which forms the isolated pattern) and a centroid 161 of an edge 159 of the pattern image to-be-inspected (which forms the isolated pattern).

Moreover, it may be conceivable that, in FIG. 47, the deformation quantities of the feature quantities of the isolated pattern (area, length of periphery, the degree of circularity, moment, etc.) is measured. That is, it may be conceivable that the difference between the feature quantity of the edge 160 of the reference pattern and the feature quantity of the edge 159 of the pattern image to-be-inspected is measured.

Figure 48A:
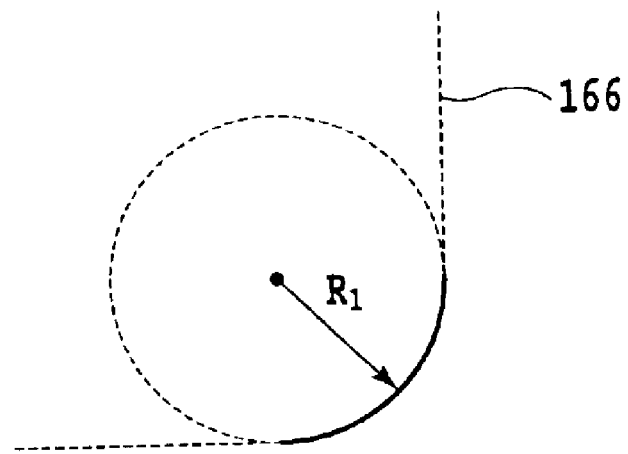
FIG. 48A is a diagram showing an example of the corner of the edge of the reference pattern.
Figure 48B:
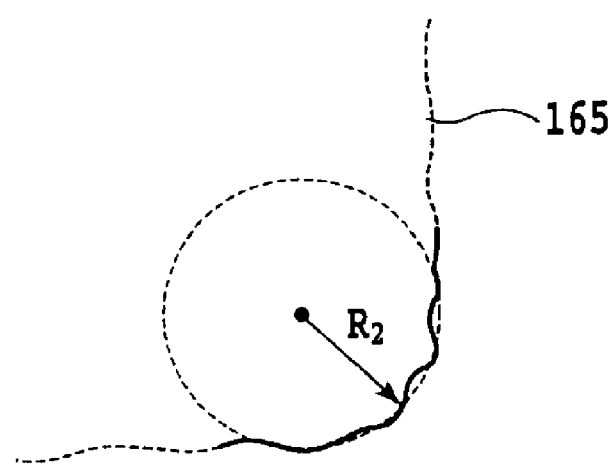
FIG. 48B is a diagram showing an example of the corner of the edge of the pattern image to-be-inspected.

FIG. 48A is a diagram showing an example of the corner of an edge of the reference pattern, and FIG. 48B is a diagram showing an example of the corner of the edge of the pattern image to-be-inspected. The corner of an edge 166 of the reference pattern shown in FIG. 48A has undergone rounding processing. As the radius of curvature of the corner, for example, a major axis or minor axis of an ellipse, or a radius of a circle that is obtained when the curve of the corner is approximated with the ellipse or the circle by the least-squares method can be used. By obtaining the radius of curvature of the corner of the edge 166 of the reference pattern and that of the corner of an edge 165 of the pattern image to-be-inspected, the deformation quantity of the radius of curvature of the corner can be found.

The foregoing inspection may be performed one position by one position. Alternatively, the inspection may be performed simultaneously (in one-time imaging) for a plurality of positions within one imaging region (within a field of view).

The inspection item is selected according to (R1) "Pattern deformation quantity to calculate" of the above-described recipe items.

There are several kinds of extraction rules (the above-described (R4)) for the pattern attributes, and several examples will be described referring to FIG. 45. The corner is extracted as a feature positioned in the vicinity of connecting points where two pairs of two lines connect with each other at a predetermined angle (90 degrees, 270 degrees, etc.). The long wiring is extracted as two parallel line segments with a spacing equal to the line width and having a length not less than a predetermined length. The top end is extracted as a part of a line segments having a length equal to the line width with whose ends a third line segment having a length not less than a predetermined length comes in contact at an angle of 90 degrees. The isolated pattern is extracted as a closed figure having an area not more than a predetermined area.

(The Second Edge Detection)

The inspection part 12 detects the edge for the second time from the pattern image to-be-inspected with respect to a part where no defect was detected as a result of the defect detection (step S334).

Figure 53:
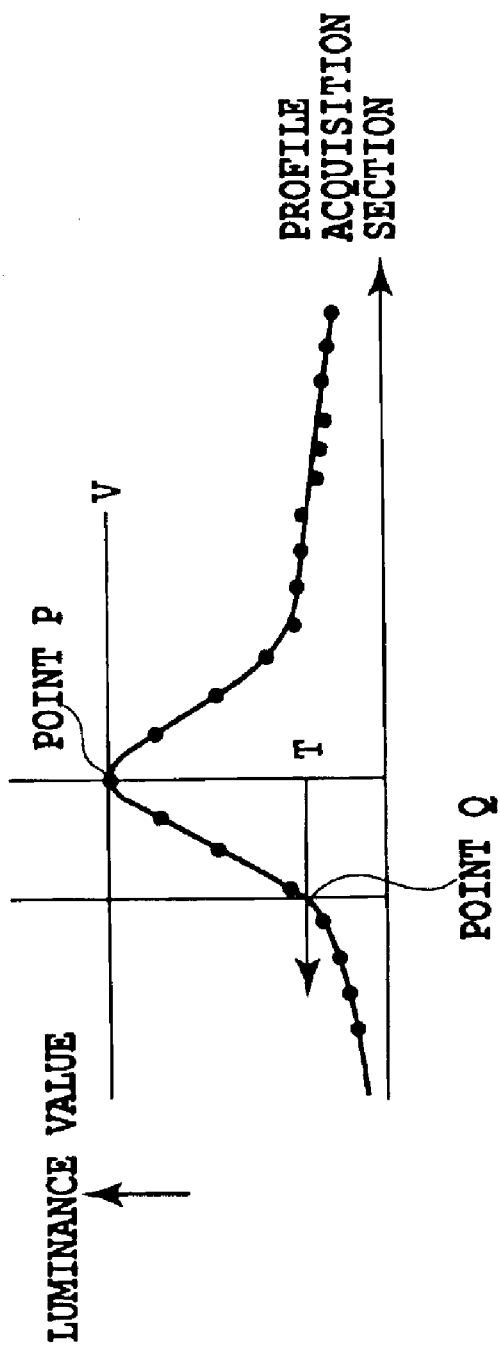
FIG. 53 is a diagram showing an example of the profile.

This edge detection of the pattern image to-be-inspected is conducted by obtaining a profile on the pattern image to-be-inspected based on the second reference pattern. Here, as the second reference pattern, the reference pattern in the case where the position of point Q in FIG. 53 is regarded as the edge is used. On the contrary, as the first reference pattern, for example, for the image such that the "only the edge is bright" as described above in (B), the reference pattern in the case where the position of point P is regarded as the edge is used. Therefore, the second reference pattern generally differs from the first reference pattern.

Before conducting the edge detection of the pattern image to-be-inspected, the second reference pattern is shifted by the above-described shift quantity $S_1+S_2$. Any processing thereafter is conducted while this shift is being maintained.

For methods to obtain the edge position from the profile, various methods have been disclosed, such as the threshold method, the linear approximation method. In the present embodiment, the threshold method among the methods hitherto disclosed is used and the measurement of the line width that is conducted in the CD-SEM is applied to two-dimensional patterns (pattern image to-be-inspected). However, if the threshold method is replaced with other method such as the linear approximation method, the processing can be made similarly. Here, the linear approximation method is a method whereby the profile is approximated with lines and an intersection of the line is used to specify the edge position.

Two kinds of ways are conceivable to detect the edge. One of those is a method whereby the directions and the positions for taking the profiles are set beforehand to the second reference pattern.

In this embodiment, in the case where the profile acquisition sections are intended to be set beforehand, it is done when forming the recipe as described above. In this case, (R6) "a flag for indicating whether or not the profile acquisition sections are set to be variable and is to be determined during measurement" of the above-described recipe item is set OFF, so that it means that the profile acquisition sections are set to the second reference pattern beforehand.

Figure 49:
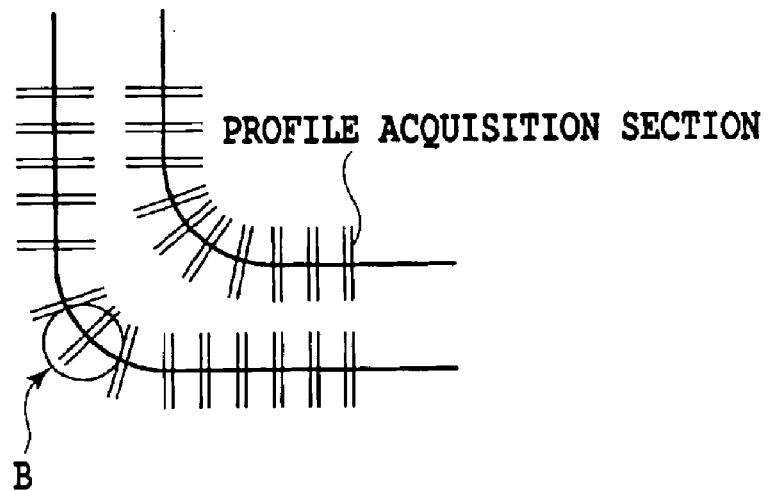
FIG. 49 is a diagram showing an example of profile acquisition sections.
Figure 50:
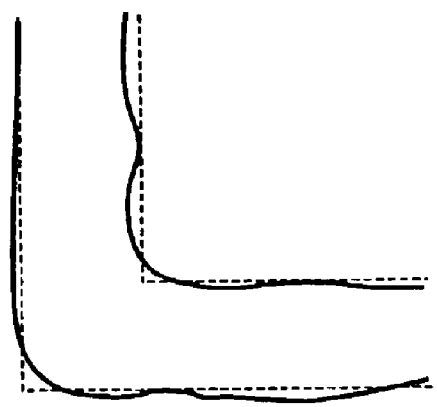
FIG. 50 is a diagram showing the curves that demarcate the shape of the exposed pattern obtained by litho-simulator.

The section where the profile is acquired (profile acquisition section) is set based on (R5) "a length of the profile acquisition section" and "an interval between the profile acquisition sections," for example, as shown in FIG. 49, being set in a direction perpendicular to the second reference pattern with the second reference pattern being set as a middle point thereof (double lines in the figure). The second reference pattern shown in FIG. 49, as was already described referring to FIG. 7, has been corrected so that the corner part was rounded. Furthermore, instead of the above-described second reference pattern, as shown in FIG. 50, the curves demarcating the shape of the exposed pattern obtained by litho-simulator (solid lines in the figure) can be used.

In the second edge detection process, the profile is formed in the positions (section) corresponding to the above-described profile section in the pattern image to-be-inspected, based on the spacing with which the luminance value is examined in the profile acquisition section of (R5). The spacing is set to an arbitrary value not more than the normal pixel spacing and the length of the profile section is set to an arbitrary length longer than the allowable pattern deformation quantity. The profile is formed by means of techniques such as the bilinear interpolation, the spline interpolation, Fourier series.

Figure 51:
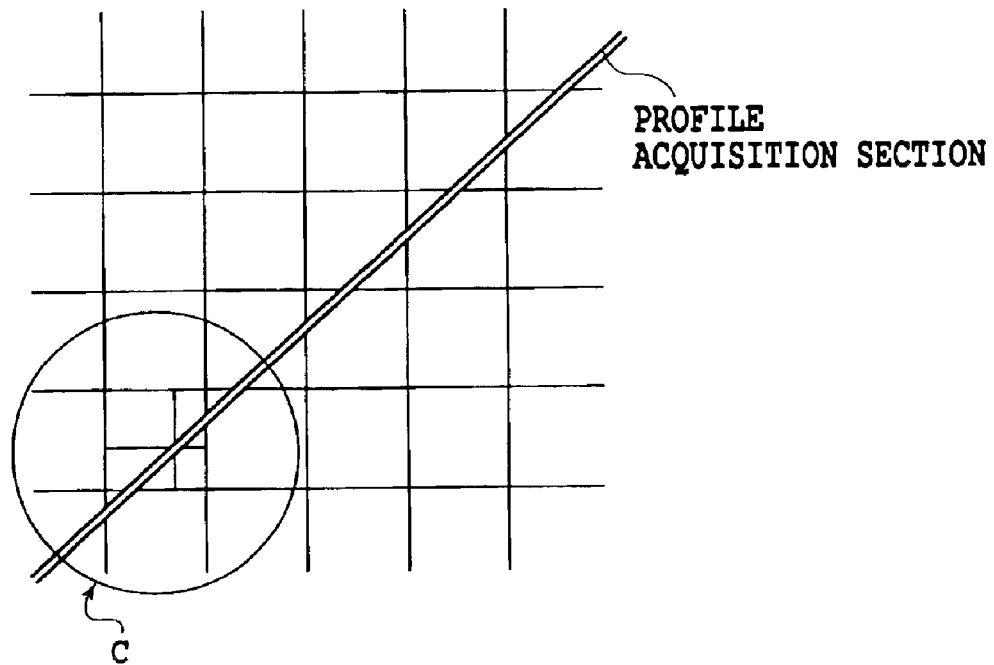
FIG. 51 is a diagram showing an enlarged part of FIG. 49 (portion of B)
Figure 52:
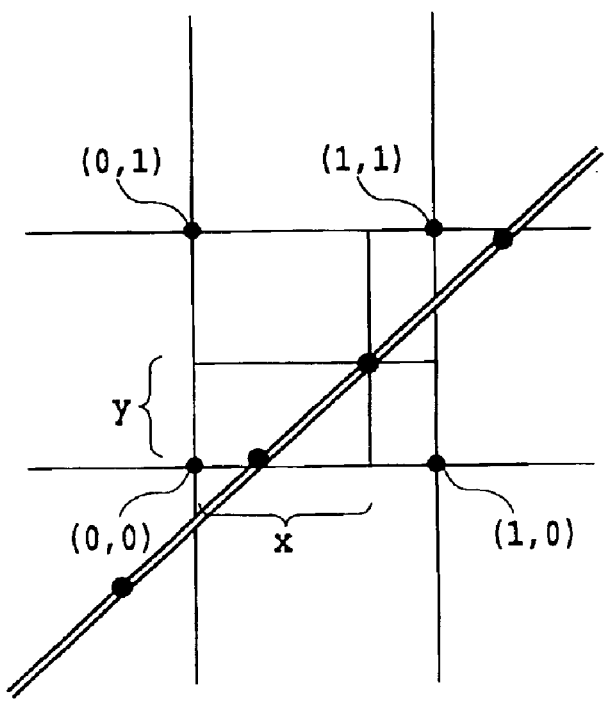
FIG. 52 is a diagram showing an enlarged part of FIG. 51 (portion of C)

FIG. 51 is an enlarged diagram of a part of FIG. 49 (portion B) and FIG. 52 is an enlarged diagram of a part of FIG. 51 (portion C). The double lines in the figure indicate the profile acquisition sections, intersections of the grid represent positions of the pixels, and the solid circles show positions where the luminance value of the pattern image to-be-inspected is examined.

The bilinear interpolation method is a method whereby the luminance value I(x, y) at a position (x, y) ($0<x\leq1$, $0<y\leq1$) is calculated by the following formula using the luminance values I(0,0), I(0,1), I(1,0), I(1,1) of the pixels indicated by (0, 0), (0, 1), (1, 0), (1, 1).

$$I(x, y)=[I(0,0)(1-x)+I(1,0)x](1-y)+[I(0,1)(1-x)+I(1,1)x]y$$

From the profile obtained by this formula, the second edge position is determined by applying the threshold value method. As shown in FIG. 53, the maximum luminance value V and its position P in the obtained profile are found. The maximum luminance value V is multiplied by a previously specified coefficient k to find a threshold value T, and intersections of a line whose luminance value is equal to the threshold value T and the profile curve are obtained. An intersection Q of these intersections, which is located in an outward direction of the pattern from the point P and closest to the point P, is obtained. For all the profiles, such intersections Q are obtained and regarded as the discrete positions of the second edges.

The coefficient k plays a role to determine the second edge positions. That is, since the actual cross-sectional shape of a wiring pattern formed on the wafer has a trapezoidal shape, the operator can determine whether the edge position should be controlled at the upper side, the lower side, or the middle part between both sides thereof by adjusting the coefficient k.

Figure 54A:
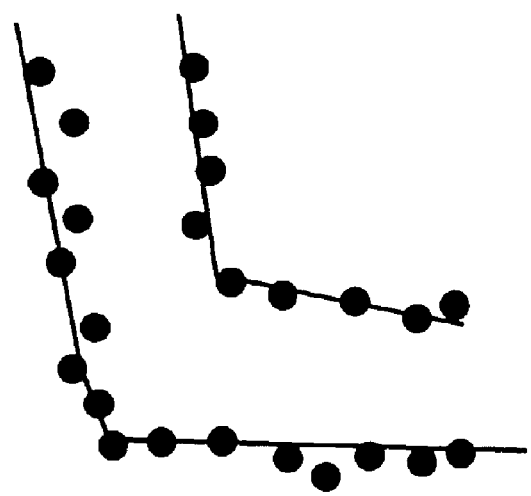
FIG. 54A and FIG. 54B are diagrams showing examples where the second edge positions (points) were approximated with curves and the second edges were obtained.
Figure 54B:
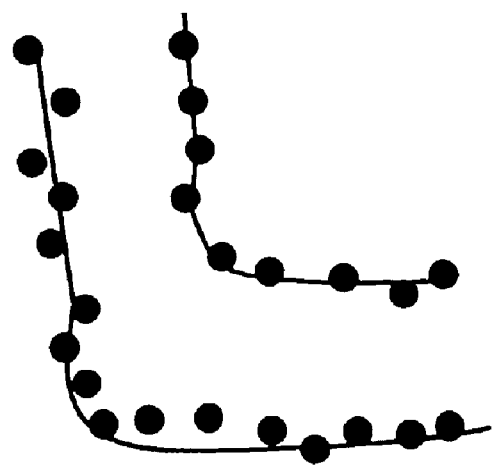

After the above-described edge positions are obtained, those positions are approximated with curves (including the polygon approximation) to define the second edges. The simplest method for this purpose is to link those positions simply with segment lines (polygonal lines). However, as a method to link the positions smoothly using a least-squares method, for example, the following method can be used. That is, as shown in FIG. 54A, the split-and-merge method disclosed in T. Pavlidis and S. L. Horowitz: "Segmentation of plane curves," IEEE Trans. on Computers, vol. C-23, No. 8, August, 1974 can be used. Alternatively, a curve approximation based on smoothing of plane data using the least-squares method and a two-dimensional spline function, as shown in FIG. 54B, can also be used. The former can be processed rapidly, but has little flexibility for shapes containing a lot of rounded parts. On the other hand, the latter can fulfill the rapidity and is characteristically flexible. Besides these techniques, various methods such as a method using a Fourier descriptor and the like have been disclosed and one of these can substitute for the above techniques.

Such curve approximation as described above may be conducted just after the first edge detection was completed.

Figure 55A:
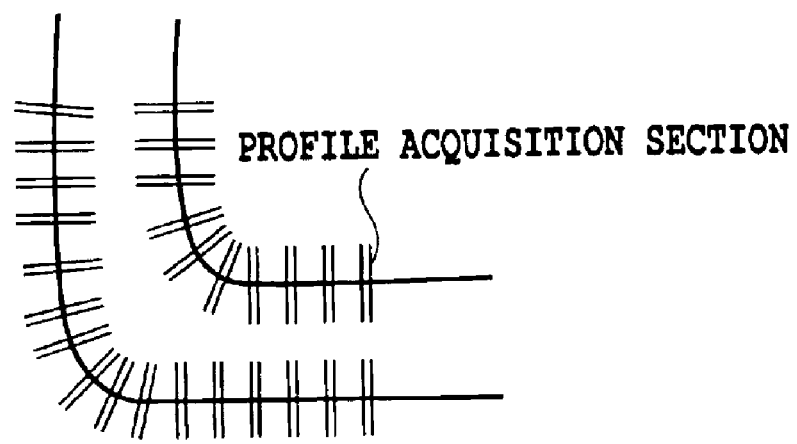
FIG. 55A is a diagram showing another example of the profile acquisition sections.
Figure 55B:
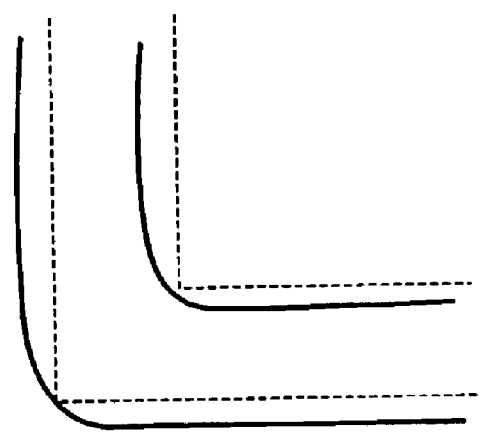
FIG. 55B is a diagram showing an example of the relation between the first edges of the pattern image to-be-inspected and the second reference pattern.

Next, as another way of conducting the approximation which is different from this, there is a method where the profile acquisition sections are set variable initially and fixed when detecting the edges. That is, as shown in FIG. 55A, it is a method of setting the profile acquisition section in a direction perpendicular to the detected the first edge of the pattern image to-be-inspected. According to this method, as shown in FIG. 55B, even if the first edges (solid lines) of the pattern image to-be-inspected don't coincide with the second reference pattern (dotted lines), the profile acquisition sections can be specified and the edges can be detected. This method can easily follow the deformation of the pattern compared to the above-described method. After the profile acquisition sections were set, the same processing as the aforesaid method is conducted.

A result of the second edge detection can be outputted into the display device 5 and the printer 6.

The detected second edges can be converted into the edge vectors for respective pixels, for example, using the method described referring to FIG. 12. This edge vector corresponds to the edge vector obtained by binarization processing before the first inspection.

(The Second Inspection)

After the detection of the second edge as described above, the inspection part 12 performs the second inspection (step S336).

This inspection is the same processing as the first inspection described above, conducts the defect detection, and obtains the pattern deformation quantity. The displacement quantity concerning the whole image obtained here (the shift quantity) $s_3$ corresponds to the above-described quantity $S_2$. The quantity $S_3$ obtained here plus $S_1$ and $S_2$ described above becomes the total shift quantity between the second reference pattern and the pattern image to-be-inspected.

The inspection result is outputted into the display device 5 and the printer 6 through the output part 13 (step S338).

When the processing described above has been conducted for all the inspection unit areas, the inspection processing is terminated; when not yet, the flow goes back to step S308 (step S340).

(Other Inspection)

Figure 56:
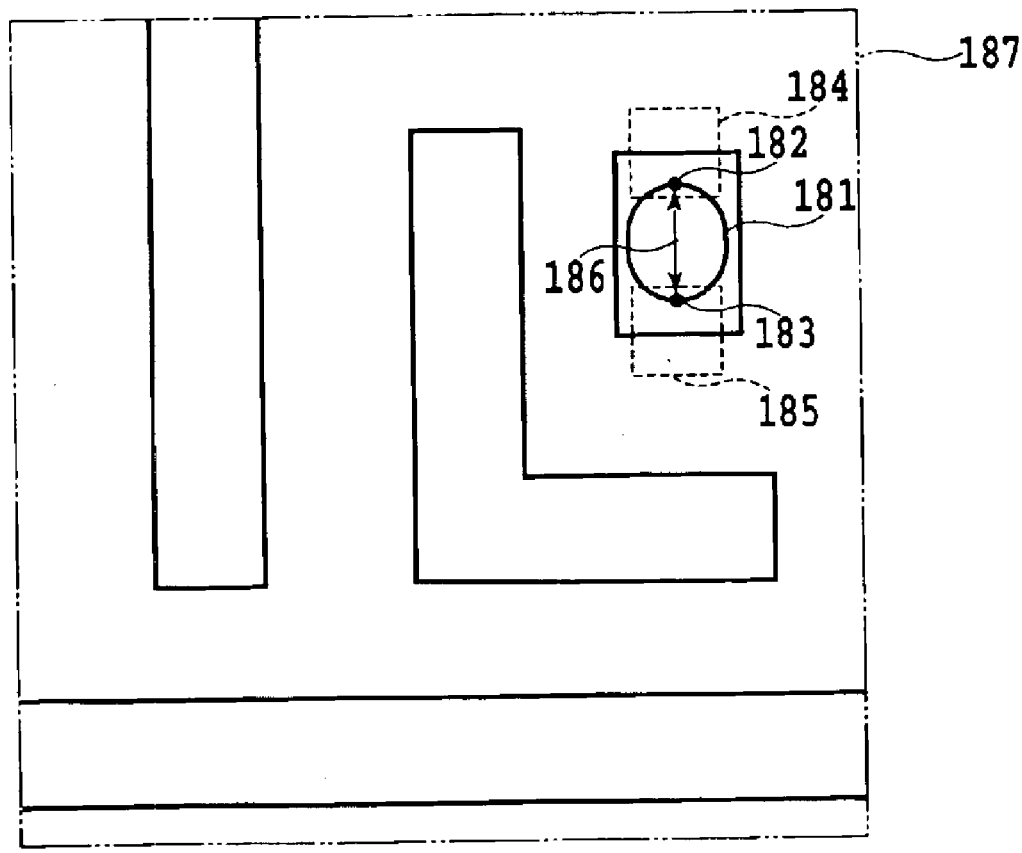
FIG. 56 is a diagram showing an example where the measurement is conducted using a high-magnification image and a low-magnification image.

In the case of an SEM with a function that enables the operator to observe a part of a low-magnification image with a high-magnification electromagnetically, a pattern that cannot be observed in full view with a high-magnification can also be measured. That is, this means that the edge position obtained with a high-magnification can be converted correctly into the edge position obtained with a low-magnification. A similar relation may be realized with a high-precision stage. For example, in FIG. 56, if positions 182 and 183 on a pattern 181 of the pattern image to-be-inspected are obtained using a high-magnification images 184 and 185, respectively, these positions are converted into the positions on a low-magnification image 187, and a width 186 of the pattern 181 of the pattern image to-be-inspected is obtained; the width 186 can be measured more accurately than that as measured only using the low-magnification image 187.

(Adjustment of Inclination and Magnification)

In the foregoing inspection methods, by using a technique for the pattern deformation quantity, adjustment of the inclination and magnification of the pattern image to-be-inspected can be conducted before the inspection or at an appropriate time during the inspection as the need arises. That is, a part suited to the adjustment of the pattern image to-be-inspected and the reference pattern are acquired. Through the affine transformation, several pattern images to-be-inspected that have undergone the alteration of the inclination and magnification and which can be candidates are obtained. By comparing the obtained pattern images to-be-inspected and the reference pattern, a pattern image to-be-inspected whose pattern deformation quantity is the minimum is selected. The inclination and magnification for the selected pattern image to-be-inspected are registered as the correction quantities. Alternatively, other than affine transforming the pattern image to-be-inspected, a method of affine transforming the reference pattern may be adopted.

Here, the affine transformation means the linear transformation using the coefficients a to f shown below.

$X = ax + by + c$ $Y = dx + ey + f$

Through the use of the information that can be obtained by the aforesaid inspection method of the present invention, such as the pattern deformation quantity, and the position, size, and defect class of the defective area, plus the statistic quantity of the pattern deformation quantity and the images, the following can be performed: an analysis of influence of the defective area on the circuit; an analysis of influence of the previous/subsequent process on the circuit; and an analysis of the optimized parameters such as an exposure condition.

If one may pay attention to a part for outputting the shift quantity, the pattern inspection apparatus according to this embodiment can also be considered as an apparatus for performing the pattern matching.

In the foregoing, the one example according to the present invention is described. However, other various variants are possible. For example, it is easy to modify this embodiment into an off-line input processing system where the acquired image data is inputted through an external input device such as the magneto-optical disk and the magnetic tape or through an LAN such as the Ethernet. Moreover, it is possible to construct a hybrid technique whereby a typical die in the wafer is inspected by the method according to the present invention and other dies are inspected by the die-to-die comparison. Furthermore, the image generation method may be any method other than described in this embodiment and the design data is not limited to the CAD data but may be other type of data. In this embodiment, the inspection result and the like is outputted into the display device 5 and the printer 6, but may be outputted into an image database, a simulator, a recording medium, etc., or may be transmitted (outputted) to other computer through a network.

As explained in the foregoing, according to the present invention, the comparative inspection between the pattern image to-be-inspected and the reference pattern can be performed in real time.

Furthermore, the matching can be conducted while allowing such shape difference that falls within the electrically allowable range.

Moreover, stable defect detection can be conducted.

Furthermore, the measurement of the two-dimensional pattern (pattern image to-be-inspected) hitherto having been conducted on visual inspection can be executed quantitatively, rapidly and automatically.

The present invention has been described in detail with respect to preferred embodiments and it will now be apparent from the foregoing to those skilled in the art that changes and deformations may be made without departing from the invention in its broader aspects, and it is the intention, therefore, in the appended claims to cover all such changes and deformations as fall within the true spirit of the invention.

What is claimed is:

1. A pattern inspection apparatus for inspecting a pattern to-be-inspected by comparing an image of said pattern to-be-inspected with a reference pattern obtained from design data, said pattern inspection apparatus comprising:

storage means for storing said reference pattern;

inputting means for inputting said pattern image to-be-inspected;

detecting means for detecting an edge of said pattern image to be-inspected;

inspecting means for inspecting said pattern to-be-inspected by comparing the edge of said pattern image to-be-inspected and an edge of said reference pattern;

outputting means for outputting a result of said inspection; and means for converting said design data into said reference pattern by correcting said design data with respect to a deformation which may occur in said pattern to-be-inspected.

2. The pattern inspection apparatus as claimed in claim 1, wherein said detecting means detects the edge of said pattern image to-be-inspected with a sub pixel accuracy.

3. The pattern inspection apparatus as claimed in claim 1, wherein said inspecting means assumes the correspondence of the edge of each pixel of said reference pattern to the edge of each pixel of said pattern image to-be-inspected.

4. The pattern inspection apparatus as claimed in claim 3, wherein said correspondence-assumption is conducted considering the distance between the edge of each pixel of said reference pattern and the edge of each pixel of said pattern image to-be-inspected and the directional difference between both the edges.

5. The pattern inspection apparatus as claimed in claim 3, wherein said inspecting means constructs an area based on the edges of said pattern image to-be-inspected in which said inspecting means failed to assume said correspondence to the edges of said reference pattern, and recognizes said area as a defective area.

6. The pattern inspection apparatus as claimed in claim 3, wherein said inspecting means constructs an area based on the edges of said pattern image to be-inspected in which said inspecting means succeeded in assuming said correspondence to the edges of said reference pattern, detects an area whose luminance distribution is non-uniform among the areas, and determines said area as a defective area.

7. The pattern inspection apparatus as claimed in claim 5 or 6, wherein said inspecting means judges a defect class based on geometrical feature quantities of said defective area.

8. The pattern inspection apparatus as claimed in claim 5 or 6, wherein said inspecting means judges a defect class based on a feature quantity concerning the luminance of said defective area.

9. The pattern inspection apparatus as claimed in claim 3, wherein said inspecting means calculates a pattern deformation quantity or pattern deformation quantities of said pattern to-be-inspected with respect to said reference pattern.

10. The pattern inspection apparatus as claimed in claim 9, wherein said pattern deformation quantity includes at least one of a displacement quantity, a magnification variation quantity, and a dilation quantity of the line width.

11. The pattern inspection apparatus as claimed in claim 9, wherein said inspecting means adds an attribute of the pattern to said reference pattern.

12. The pattern inspection apparatus as claimed in claim 1, wherein said inspecting means forms a profile by examining luminance values in a profile acquisition section in said pattern image to-be-inspected, detects predetermined points for each said profile, approximates the detected points with a curve, and assumes the curve to be an edge of said pattern image to-be-inspected.

13. A pattern inspection apparatus for inspecting a pattern to-be-inspected by comparing an image of said pattern to-be-inspected with a reference pattern obtained from design data, said pattern inspection apparatus comprising:

storage means for storing said reference pattern;

inputting means for inputting said pattern image to-be-inspected;

inspecting means for inspecting said pattern to-be-inspected by comparing an edge of said pattern image to-be-inspected and an edge of said reference pattern; and outputting means for outputting a result of said inspection, wherein said inspecting means conducts matching between said pattern image to-be-inspected and said reference pattern by comparing the edge of said pattern image to-be-inspected and the edge of said reference pattern; and means for converting said design data into said reference pattern by correcting said design data with respect to a deformation which may occur in said pattern to-be-inspected.

14. The pattern inspection apparatus as claimed in claim 13, wherein said matching is conducted by dilating the edge of said pattern image to-be-inspected or the edge of said reference pattern.

15. The pattern inspection apparatus as claimed in claim 14, wherein said matching is conducted by dilating the edge of said pattern image to-be-inspected or the edge of said reference pattern with weightings given.

16. The pattern inspection apparatus as claimed in claim 13, wherein said matching is conducted by using the total sum of products of amplitudes of the edges of said pattern image to-be-inspected and amplitudes of the edges of said reference pattern at respective pixels as an evaluation value.

17. The pattern inspection apparatus as claimed in claim 13, wherein said matching is conducted by calculating an evaluation value of the matching in consideration of a direction of the edge of said pattern image to-be-inspected and a direction of the edge of said reference pattern.

18. The pattern inspection apparatus as claimed in claim 17, wherein said matching is conducted by using the total sum of inner products of edge vectors of said pattern image to-be-inspected and edge vectors of said reference pattern at respective pixels or the total sum of absolute values of said inner products as an evaluation value, wherein each of said edge vectors has a magnitude equal to amplitude of the edge and a direction identical to the direction of the edge.

19. The pattern inspection apparatus as claimed in claim 13, wherein said matching is conducted by altering for each part of said reference pattern, a contribution thereof to the matching.

20. The pattern inspection apparatus as claimed in claim 19, wherein said matching is conducted by extracting a unique pattern by using periodicity of said reference pattern, and setting different weightings for an evaluation value of the matching depending on whether a pattern in said reference pattern is the unique pattern or not.

21. The pattern inspection apparatus as claimed in claim 1, or 13, further comprising means for setting allowable pattern deformation quantity and/or allowable pattern directional difference with respect to said reference pattern.

22. The pattern inspection apparatus as claimed in claim 21, wherein allowable pattern deformation quantity and/or said allowable pattern directional difference can be set individually in accordance with an attribute of said reference pattern.

* * * * *